(12) United States Patent
Tunnicliffe et al.

(10) Patent No.: US 7,201,804 B2
(45) Date of Patent: *Apr. 10, 2007

(54) CLEANING OF HYDROCARBON-CONTAINING MATERIALS WITH CRITICAL AND SUPERCRITICAL SOLENTS

(75) Inventors: Ian Tunnicliffe, Church Stretton (GB); Ray Mt. Joy, Spring, TX (US)

(73) Assignee: Labo Liquids, LLC, Houston, TX (US)

(*) Notice: Subject to any disclaimer, the term of this patent is extended or adjusted under 35 U.S.C. 154(b) by 505 days.

This patent is subject to a terminal disclaimer.

(21) Appl. No.: 10/470,965

(22) PCT Filed: Jul. 31, 2002

(86) PCT No.: PCT/US02/24207

§ 371 (c)(1),
(2), (4) Date: Jul. 31, 2003

(87) PCT Pub. No.: WO03/063998

PCT Pub. Date: Aug. 7, 2003

(65) Prior Publication Data

US 2004/0065353 A1 Apr. 8, 2004

Related U.S. Application Data

(63) Continuation-in-part of application No. 10/066,291, filed on Jan. 31, 2002.

(60) Provisional application No. 60/265,825, filed on Feb. 1, 2001.

(51) Int. Cl.
*B08B 7/04* (2006.01)

(52) U.S. Cl. .......................... 134/11; 134/10; 134/40; 134/42

(58) Field of Classification Search .................. 134/10, 134/11, 40, 42
See application file for complete search history.

(56) References Cited

OTHER PUBLICATIONS

Oil-base Mud Drill-Cuttings Cleaner, CFS Inc., An Arthur D. Little Company, Cambridge, MA, Apr. 30, 1981.*

* cited by examiner

*Primary Examiner*—Alexander Markoff
(74) *Attorney, Agent, or Firm*—Robert W Strozier

(57) ABSTRACT

A method for cleaning materials containing solids and/or liquids is disclosed which involves contacting the materials with an extracting fluid including Xe, $NH_3$, lower aromatics, nitrous oxide, water, CO, $CO_2$, $H_2O$, lower alcohols, lower alkanes, lower alkenes, or mixtures or combinations thereof under conditions of temperature and pressure sufficient to maintain the fluid at, near or above its critical point and to products derived therefrom.

9 Claims, 11 Drawing Sheets

CLEANING OF HYDROCARBON-CONTAINING MATERIALS WITH CRITICAL AND SUPERCRITICAL SOLENTS

RELATED APPLICATION

This application is a 35 U.S.C. § 371 Nationalization of PCT/US02/24207 filed 31 Jul. 2002 designated as a Continuation-in-Part of U.S. patent application Ser. No. 10/066, 291 filed 31 Jan. 2002, which claims provisional priority to United States Provisional Application Ser. No. 60/265,825 filed 1 Feb. 2001.

BACKGROUND OF THE INVENTION

1. Field of the Invention

The present invention relates to an efficient and cost effective method for treating hydrocarbon-containing materials to remove solids, water, sulfur and/or other contaminants.

More particularly, the present invention relates to a method for cleaning hydrocarbon-containing materials including oil-containing materials such as well-fluids, drilling fluids, used oils, oil contaminated soils, or the like, under near critical, critical and/or supercritical conditions to produce a clean solid residue, an hydrocarbon residue and an aqueous residue, where the hydrocarbon residue is reusable, the solid residue is substantially free of hydrocarbons and aqueously extractable contaminants and the aqueous residue can be further cleaned to produce a purified water residue.

2. Description of the Related Art

Critical and supercritical extraction processes have been known for some time. Supercritical extraction has been used to clean oil and to desulfurize coal, but the technique has not been used to clean up drilling fluids so that the cutting are substantially free of hydrocarbon residue and/or aqueously soluble contaminants.

Thus, there is a need in the art for a method for cleaning drilling fluids and solid concentration derived therefrom generally via centrifugation to a purified solid material substantially free of hydrocarbon residues, drilling field chemicals and/or water soluble contaminants.

SUMMARY OF THE INVENTION

The present invention provides a solid residue substantially free of organic and/or non-organic water-soluble components, where the solid residue is derived from critical and/or supercritical extraction of a material including the solid, organic and/or non-organic water-soluble components with a cleaning composition comprising CO, $CO_2$, $H_2O$, lower alcohols, lower alkanes, lower alkenes or mixtures or combinations thereof.

The present invention provides a slurry residue substantially free of organic components, where the slurry residue is derived from near critical, critical and/or supercritical extraction of a material including the solid, organic and/or non-organic water-soluble components and water with a cleaning composition comprising CO, $CO_2$, $H_2O$, lower alcohols, lower alkanes, lower alkenes or mixtures or combinations thereof.

The present invention provides a water-insoluble liquid residue substantially free of solids and/or non-organic water-soluble components, where the liquid residue is derived from critical and/or supercritical extraction of a material including the solid, organic and/or non-organic water-soluble components with a cleaning composition comprising CO, $CO_2$, $H_2O$, lower alcohols, lower alkanes, lower alkenes or mixtures or combinations thereof.

The present invention provides a hydrocarbon residue substantially free of solids and/or water soluble components including organic and inorganic, water-soluble components or mixtures thereof, where the hydrocarbon liquid residue is derived from critical and/or supercritical extraction of a material including the solid, organic and/or non-organic water-soluble components with a cleaning composition comprising CO, $CO_2$, $H_2O$, lower alcohols, lower alkanes, lower alkenes or mixtures or combinations thereof.

The present invention provides a method for cleaning a solid material including contacting the mixture with a cleaning composition including CO, $CO_2$, $H_2O$, lower alcohols, lower alkanes, lower alkenes or mixtures or combinations thereof under conditions of temperature and pressure sufficient to maintain the cleaning composition at, near or above its critical point for a time sufficient to achieve a desired degree of cleaning of the solid material.

The present invention provides a method for cleaning a solid material including contacting the mixture with a cleaning composition including CO, $CO_2$, $H_2O$, lower alcohols, lower alkanes, lower alkenes or mixtures or combinations thereof under conditions of temperature and pressure sufficient to maintain the cleaning composition at, near or above its critical point for a time sufficient to achieve a desired degree of cleaning of the solid material to form an organic residue and a mixture of water and the solid material, which can be in the form of an aqueous slurry, dispersion, suspension or other aqueous/solid mixture.

The present invention provides a method for cleaning a mixture including contacting the mixture with a cleaning composition including CO, $CO_2$, $H_2O$, lower alcohols, lower alkanes, lower alkenes or mixtures or combinations thereof under conditions of temperature and pressure sufficient to maintain the cleaning composition at, near or above its critical point for a time sufficient to achieve a desired degree of separation of the mixture.

The present invention provides a method for cleaning a mixture including contacting the mixture including a solid component, a water-insoluble liquid component and water with a cleaning composition including CO, $CO_2$, $H_2O$, lower alcohols, lower alkanes, lower alkenes or mixtures or combinations thereof under conditions of temperature and pressure sufficient to maintain the cleaning composition at, near or above its critical point for a time sufficient to achieve a desired degree of separation of the mixture into a solid residue, a water-insoluble liquid residue and an water-soluble liquid residue.

The present invention provides a method for cleaning a mixture including contacting the mixture including a solid component, a water-insoluble liquid component and water with a cleaning composition including CO, $CO_2$, $H_2O$, lower alcohols, lower alkanes, lower alkenes or mixtures or combinations thereof under conditions of temperature and pressure sufficient to maintain the cleaning composition at, near or above its critical point for a time sufficient to achieve a desired degree of separation of the mixture into a solid residue, a water-insoluble liquid residue and/or an water-soluble liquid residue, where the solid residue is substantially free of organic and aqueously soluble components, the water-insoluble liquid residue is substantially free of solids, water or water-soluble components, and the water-soluble liquid residue is substantially free of solids and water-insoluble liquid components.

The present invention provides a method for cleaning a mixture containing solids, organics such as hydrocarbons, inorganics such as metal complexes, and/or water including contacting the mixture with a cleaning composition including CO, $CO_2$, $H_2O$, lower alcohols, lower alkanes, lower alkenes or mixtures or combinations thereof under conditions of temperature and pressure sufficient to maintain the composition in a supercritical state for a time sufficient of achieve a desired degree of component separation.

The present invention provides a method for cleaning drilling fluids, oil contaminated soil, oil pit material, or the like including contacting a drilling fluid with a cleaning composition including CO, $CO_2$, $H_2O$, lower alcohols, lower alkanes, lower alkenes or mixtures or combinations thereof under near critical, critical or supercritical conditions.

The present invention provides a method for cleaning used motor oils including contacting a used-motor oil with a cleaning composition including CO, $CO_2$, $H_2O$, lower alcohols, lower alkanes, lower alkenes or mixtures or combinations thereof under near critical, critical or supercritical conditions, to produce a reusable motor oil. Preferably, the reusable motor oil is substantially clear in color and has the characteristic of the motor oil prior to the addition of one or more additives, especially polar and/or water soluble additives. The reusable motor oil also generally has a lower sulfur content that the sulfur content found in the used motor oil prior to cleaning.

The present invention provides a method for desulfurizing a hydrocarbon fuel such as fuel oil, gasoline, diesel fuel, jet fuel or similar hydrocarbon fuels including contacting a hydrocarbon fuel with a composition including CO, $CO_2$, $H_2O$, lower alcohols, lower alkanes, lower alkenes or mixtures or combinations thereof under near critical, critical or supercritical conditions, to produce a hydrocarbon fuel having a sulfur content less than the sulfur content of the hydrocarbon fuel prior to cleaning.

DESCRIPTION OF THE DRAWINGS

The invention can be better understood with reference to the following detailed description together with the appended illustrative drawings in which like elements are numbered the same:

FIGS. 8A&B depict a schematic diagram of two preferred embodiment of a continuous multi-staged apparatus of this invention for cleaning and/or desulfurizing used hydrocarbons including used motor oils or cleaning and/or desulfurizing hydrocarbon fuels including gasoline, fuel oil, diesel fuel, jet fuel or the like;

DETAILED DESCRIPTION OF THE INVENTION

Figure 1:
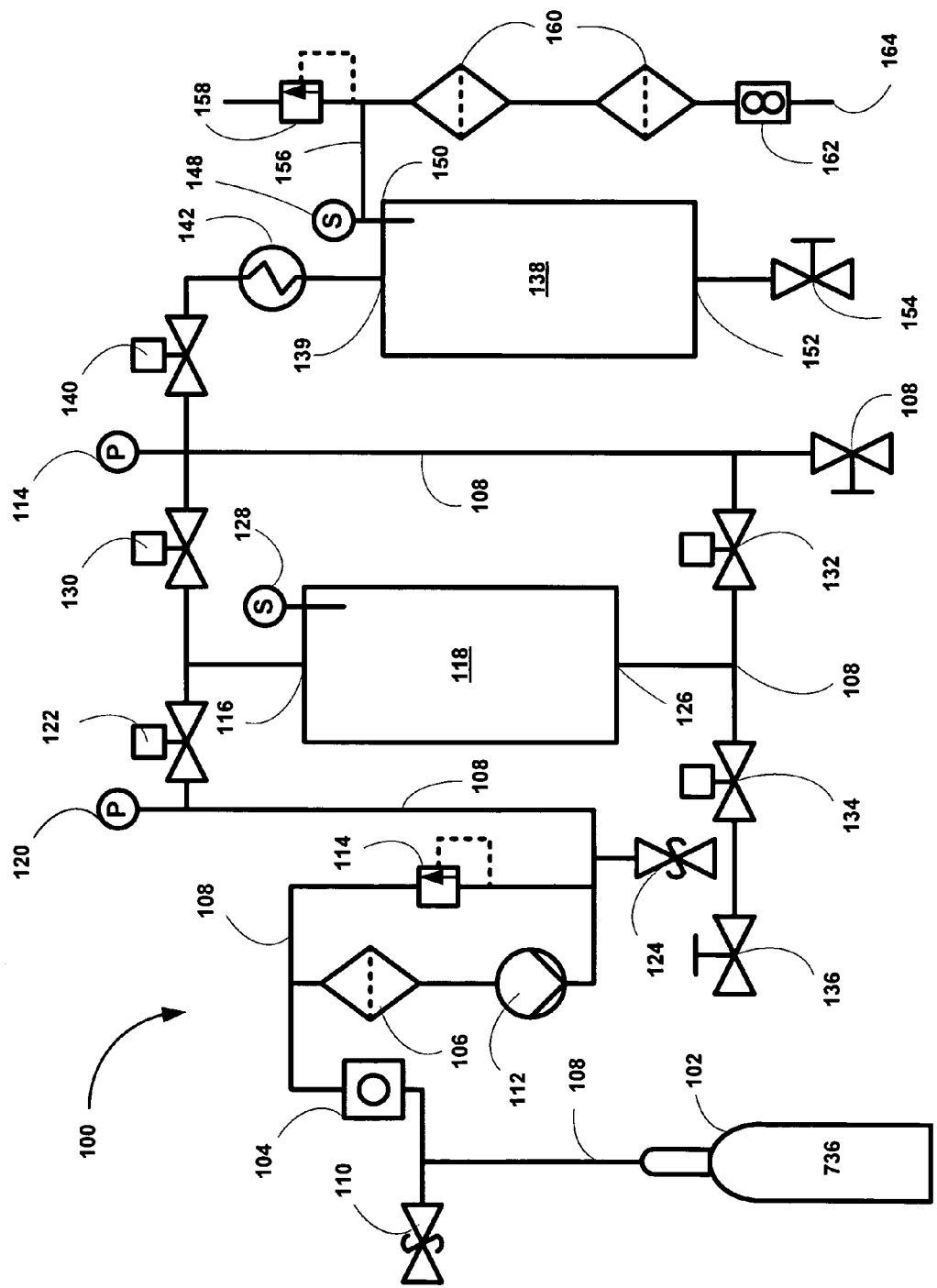
FIG. 1 depicts a schematic diagram of a preferred embodiment of a batch type apparatus for carrying out the process of this invention.

The inventors have found that an efficient and cost effective process for cleaning solid materials and/or mixtures containing solid materials can be developed using a cleaning composition at, near or above is critical point. The processes of this invention can produce a solid residue substantially free of hydrocarbons, water soluble contaminants and/or other contaminants, a water-insoluble liquid residue substantially free of solids, water-soluble contaminants and/or other contaminants and a aqueous residue substantially free of solids and water-insoluble liquid contaminants.

The present invention broadly relates to a process for cleaning solids, dispersions, slurries, and/or liquids under near critical, critical or supercritical fluid extraction where the extracting fluid includes Xe, $NH_3$, lower aromatic including benzene and toluene, nitrous oxide, water, CO, $CO_2$, $H_2O$, lower alcohols including methanol, ethanol, propanol, and isopropanol, lower alkanes including methane, ethane, propane, butane, pentane and hexane, petroleum ether, lower alkenes including ethylene and propylene or mixtures or combinations thereof.

The process is ideally suited for cleaning drilling fluids, reactor sludge, oil-contaminated soils, oil contaminated water, used oil, hydrocarbon fuels such as diesel fuel, jet fuel and other similar hydrocarbon fuels, extracting oils from tar sands or the like, tanker bottoms, refinery bottoms, pit residues, refinery waste streams, refinery residue streams or the like. The pit residue include any material that comprises oil and solid materials such as soil, dirt or the like. The pit residue is generally associated with refining and/or separation and/or processing of crude oil streams. The present invention can also be used to extract hydrocarbon material out of paint wastes, polymer waste or any other chemical processing waste or waste stream that contains hydrocarbon materials, solid materials, water and/or other components that are amenable to near critical, critical and/or supercritical extraction.

The process results in purified hydrocarbons, purified solids, and/or purified water. However, near critical, critical and/or supercritical extraction is generally combined with other downstream water purification process to produce a purified water.

Drilling fluids are complex compositions that are the by-product of oil well drilling operations. These fluids can include solids from drilling operations, muds or other additives or compounds used in drilling operations, greases, anti-seize compounds, hydrocarbons from hydrocarbon bearing formations, water, heavy metals, fracturing compositions, proppants, or other ingredients and mixtures and combination thereof. Drilling fluids can be in the form of a mixture of liquids and solids, a dispersions, a suspension, an emulsion, or any other liquid like mixture of solids and liquids.

Drilling fluid solids are solids obtained from an initial separation of solids from liquid components of a drilling fluid mixture. The solids are generally obtained via centrifugation of the drilling fluids as is well-known in the art. The solids generally have the appearance of a tar like material, but can be any solid like material derived from a process which removes most liquid material from the drilling fluids.

The process is also ideally suited for cleaning hydrocarbon-containing fuels such as diesel fuel, jet fuel, home heating oil and other similar hydrocarbon fuels, or even gasoline. The process results in purified hydrocarbon-containing fuels having reduced sulfur contents and a sulfur containing residue. The fuel to be treated is contacted with a treating solvent or composition under near critical, critical and/or supercritical conditions of temperature and pressure. The treatment temperature is usually from about 100° to about 400° C.

The process is also ideally suited for cleaning used motor oils to produce a reusable motor oil. Because the cleaning process removes material that are polar, many to all of the polar additives may be removed during the extraction system. Therefore, in one preferred reusable oil product of this invention, additives or additive packages are added into the cleaned oil. These additives can include any additive currently added to motor oils to improve their detergent properties or other properties.

Suitable extracting fluid include, without limitation, Xe, $NH_3$, lower aromatic such as benzene, toluene, or xylene, nitrous oxide, water, CO, $CO_2$, $H_2O$, lower alcohols such as methanol, ethanol, propanol, or isopropanol, lower alkanes such as methane, ethane, propane, butane, pentane hexane, or petroleum ether; lower alkenes such as ethylene or propylene; or mixtures or combinations thereof. Preferably, the extracting fluid includes carbon dioxide, water, lower alkanes, lower alcohols, or mixture or combinations thereof. Particularly, the extracting fluid comprises a major portion of $CO_2$ and a minor portion of a secondary fluid selected from the groups consisting of Xe, $NH_3$, lower aromatics, nitrous oxide, water, CO, $H_2O$, lower alcohols, lower alkanes, lower alkenes and mixtures or combinations thereof, where a major portion means greater than 50 mol % carbon dioxide, preferably, greater than 70 mol % carbon dioxide, particularly, greater than 90 mol % carbon dioxide, and especially, greater than 95 mol % carbon dioxide. More particularly, the extracting fluid is exclusively carbon dioxide.

Tabulated below are critical conditions for various supercritical fluids:

| Fluid | Critical temperature Tc (° K.) | Critical pressure Pc (MPa) | Critical Volume Vc (cm$^3$/mol) |
|---|---|---|---|
| Carbon dioxide | 304.14 | 7.375 | 94 |
| Water | 647.14 | 22.06 | 56 |
| Ethane | 305.32 | 4.872 | 145.5 |
| Ethene | 282.34 | 5.041 | 131 |
| Propane | 369.83 | 4.248 | 200 |
| Xenon | 289.73 | 5.84 | 118 |
| Ammonia | 405.5 | 11.35 | 75 |
| Nitrous oxide | 309.57 | 7.255 | 97 |
| Fluoroform | 299.3 | 4.858 | 133 |
| Methanol | 190.56 | 4.599 | 98.60 |
| Isopropanol | 508.3 | 4.764 | 222 |
| Toluene | 591.75 | 4.108 | 316 |

For the purposes of this invention, the term substantially free means that the cleaned component includes less than or equal to about 5 wt % of any given contaminant, preferably, less than or equal to about 2.5 wt % of any given contaminant, particularly less than or equal to about 2 wt % of any given contaminant and especially less than or equal 1 wt % of any contaminant.

The material-to-be-treated is contacted with treating solvent under supercritical conditions of temperature and pressure. The term, "supercritical," "supercritical state," "supercritical conditions," or "supercritical conditions of temperature and pressure," refers to a temperature above the critical temperature (Tc) of the solvent being used, and a pressure above the critical pressure (Pc) of the solvent being used. The treatment temperature is usually from 470° to 630° K. All temperatures herein will be given in degrees Kelvin (° K) or degree Celsius (° C.) unless otherwise stated. Treatment according to this invention is carried out at a reduced temperature (Tr) from 1.0 to about 1.4, preferably from about 1.05 to about 1.3, and at a reduced pressure (pr) from 1.0 to about 2.0, preferably from about 1.05 to about 1.5. The term, "critical," "critical state," "critical conditions" or "critical conditions of temperature and pressure," refers to a solvent at its critical temperature, Tc, and its critical pressure, Pc. The term, "near critical," "near critical state," "near critical conditions" or "near critical conditions of temperature and pressure," refers to a solvent at most about 10° C. below its critical temperature, Tc, and at most about 10 psi below its critical pressure, Pc, and preferably, at most about 5° C. below its critical temperature, Tc, and at most about 5 psi below its critical pressure, Pc.

The solvent to material-to-be-treated ratio for treatment according to this invention can range from about 0.2 to about 3 kilograms of solvent per kilogram of material-to-be-treated (Kg/Kg) preferably from about 0.3 to about 1.0 Kg/Kg. Actually, the solvent to material-to-be-treated ratio is a dimensionless number, since both the amount of solvent and the amount of material-to-be-treated are expressed on a weight basis.

The present invention can make possible the use of a much lower solvent to material-to-be-treated ratio than those used in prior art processes at the lower end of the solvent to material-to-be-treated range. However, the process of the present invention can be operated at any ratio to achieve a desired result.

The solvent flow rate is generally from about 0.2 to 3 kilograms per hour of solvent per kilogram of material-to-be-treated per hour (i.e., 0.2 to 3 kg/kg-hr). Preferably the solvent flow rate is about 0.5 kg/kg-hr. The time of treatment may range from about 0.5 to about two hours, and is preferably about one hour.

The material-to-be-treated may be treated in either a single stage or in plurality of stages (i.e., in two or more stages). In single stage extractions or treatments, the composition of the treating solvent remains uniform over the entire course of treatment, and can be any solvent described above, but is preferably carbon dioxide alone or in combination with water, a lower alcohol or a lower hydrocarbon. In plural stage extractions or treatments, the composition of the treating solvent can be the same or different from stage to stage. For some using multi-staged treatment applications, the critical temperature of the treating solvent used in each stage increases progressively. Thus, the first stage solvent may be a carbon dioxide; next a mixture of carbon dioxide and water, or carbon dioxide and methanol; the solvent for the next stage may be, for example, a mixture of methanol and water with no carbon dioxide and so on. In extreme cases, the material-to-be-treated may be contacted consecutively with each of the treating fluids, i.e., first with carbon dioxide, then with methanol, and finally with water, each in pure or substantially pure form. Whenever the composition of the solvent is varied over the course of treatment, the overall solvent composition (based on the total quantities of each treating fluid used over the entire course of treatment) is as stated above, i.e., the mole fraction of carbon dioxide is from 0 to 0.5 (preferably 0.05 to 0.25), the mole fraction of methanol is from 0.20 to 0.70 (preferably 0.30 to 0.50), and the mole fraction of water is from 0.20 to 0.70 (preferably 0.25 to 0.65).

In many of the preferred processes of this invention, carbon dioxide alone is the preferred extraction fluid. Thus, in multistage application, only the amount of carbon dioxide being supplied to each stage may vary. Again, the carbon dioxide supplied in the first stage progresses with the material-to-be-treated to the next stage. Thus as additional carbon dioxide is supplied, the ratio to carbon dioxide to the material-to-be-treated changes. Additionally, each stage can be operated at a different temperature and/or pressure to achieve a desired final product.

For solid type materials, a fixed bed, a moving bed reactor or other similar reactors can be used. Such reactor systems are described in more detail hereinafter. When the material-to-be-treated is a fluid (slurry, liquid, dispersion, suspension, mixture, or the like) at treatment temperature, a conventional stirred reactor or other type of batch, semi-batch or continuous reaction system can be used. For materials that include a large amount of solids such as drilling fluids, a preferred continuous system includes a tube within a tube within a tube type reactor described in more detail in disclosure associated with FIG. 8. For materials, such as used motor oil, which generally, do not include a large amount of solids, a preferred system includes a series of extraction units described in more detail in the disclosure associated with FIG. 9. This same type of multi-staged systems is ideally suited for reducing the sulfur content of hydrocarbon based fuels.

This invention will be further described and illustrated with reference to the drawings which represent preferred embodiments of systems for carrying out the processes of this invention, i.e., processes designed to convert drilling fluids are solids therefrom into a cleaned solid residue, a non-aqueous residue and an aqueous residue.

System and System Operation

Referring now to FIG. 1, a preferred embodiment of an extraction system generally 100 for use in the present invention is shown to include a source of a supercritical solvent 102, in this case carbon dioxide. The source 102 is connected to a sight glass 104 and a filter 106 via tubing 108. The tubing 108 is also connected to a rupture disk relief valve 110 for safety purposes. The filter 104 is connected to a pump 112 having a back pressure regulator 114 via tubing 108. The pump 112 is connected to a top entry 116 of an extraction cell 118 via tubing 108 including a pressure gauge 120, a supply control valve 122 and a second rupture disk relief valve 124. The cell 118 includes a bottom entry 126 and a sensor 128. The top entry 116 is also connected to a top outlet valve 130 via tubing 108; the bottom entry 124 is connected to a bottom outlet valve 132 and a bleed control valve 134, which is intern connected to a bleed valve 136. The top and bottom outlet control valves 130 and 132 are connected to a separation vessel 138 via a separator control 140 and a heat exchanger 142 including a second pressure gauge 144 and a bleed valve 146. The separator 138 includes a sensor 148, a carbon dioxide outlet 150 and a cleaned material outlet 152 having a control valve 154 which can be connected to a cleaned material container (not shown). The carbon dioxide outlet 150 connects to a used carbon dioxide venting line 156 includes a back pressure regulator 158, two filter 160, an flow regulator 162 and an exhaust line 164, which can be a recycle line by connecting the line to the pump 112. The entire system is amenable to computer control using standard computer control systems as are all of the other systems described herein.

The system of 100 operates by charging the cell 118 with a material to be treated. Once the cell 118 is charged, valves 130, 132, 134, and 136 are closed and valve 122 is opened to allow carbon dioxide to be pumped into the charged cell 118 via the pump 112 until a supercritical state is reached as indicated by the sensor 128. After the extraction has been allowed to run for a specified period of time, the valve 122 is closed and the pump 112 is generally turned off. After valve 112 is closed, the valves 130 and 132 are opened allowing the contents of the cell 118 to flow through valve 140, which reduces the pressure of the transferred contents, and the heat exchanger 140 to warm the contents up after pressure reduction and into the separator 138, via an inlet 139. In the separator 138, the now gaseous carbon dioxide is taken out of separator 138 through outlet 150 via venting line 156 and associated equipment to either be exhausted to the air or recycled. The cleaned material exits the separator 138 through outlet 152 controlled by the control valve 154.

The system shown in FIG. 1 is a preferred embodiment of an extraction systems, but is simply an illustrative example of a system for treating mixtures containing solids, hydrocarbons and water. Both the piping and fittings together with instrumentation can be configured in many different ways to obtain the same result.

In a batch type operation, a sample is placed into a cell. The cell is then sealed and the solvent is pumped into the cell under conditions of temperature and pressure sufficient to maintain the solvent at, near or above its critical point—near critical, critical and supercritical conditions. In a continuous operation, the solvent and the material to be separated would be continuously supplied to an extraction cell and solid-containing and liquid-containing residues would be continually removed from the cell. In either case, after contacting the solvent with the sample, the liquid phase is allowed to separate into an organic phase and an aqueous phase which can then be separated by conventional means such as decantation, stripping, distillation, or the like. The solids are either removed when the cell is opened or collected continuously for post extraction treatment.

Figure 2:
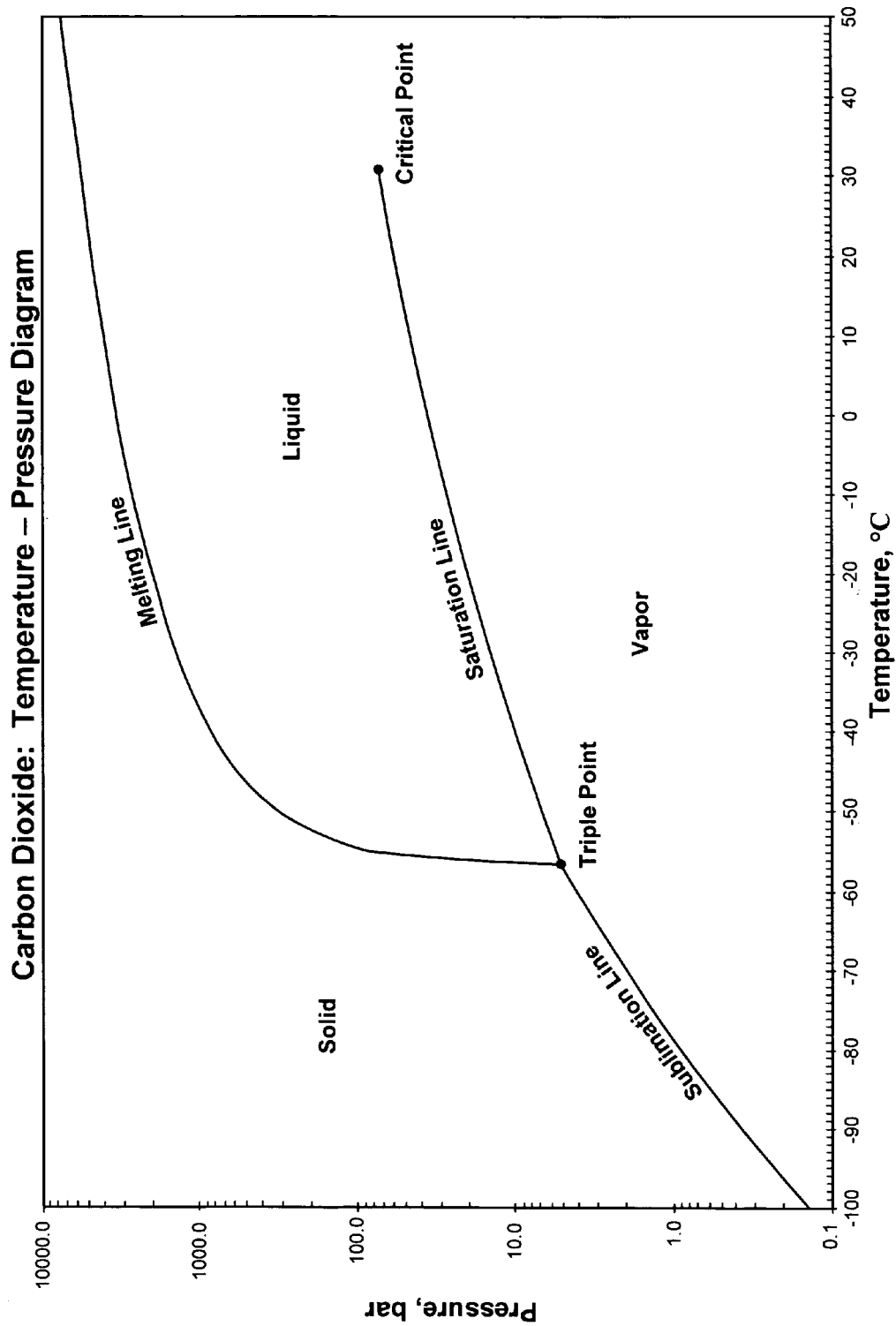
FIG. 2 depicts a phase diagram for carbon dioxide.
Figure 3:
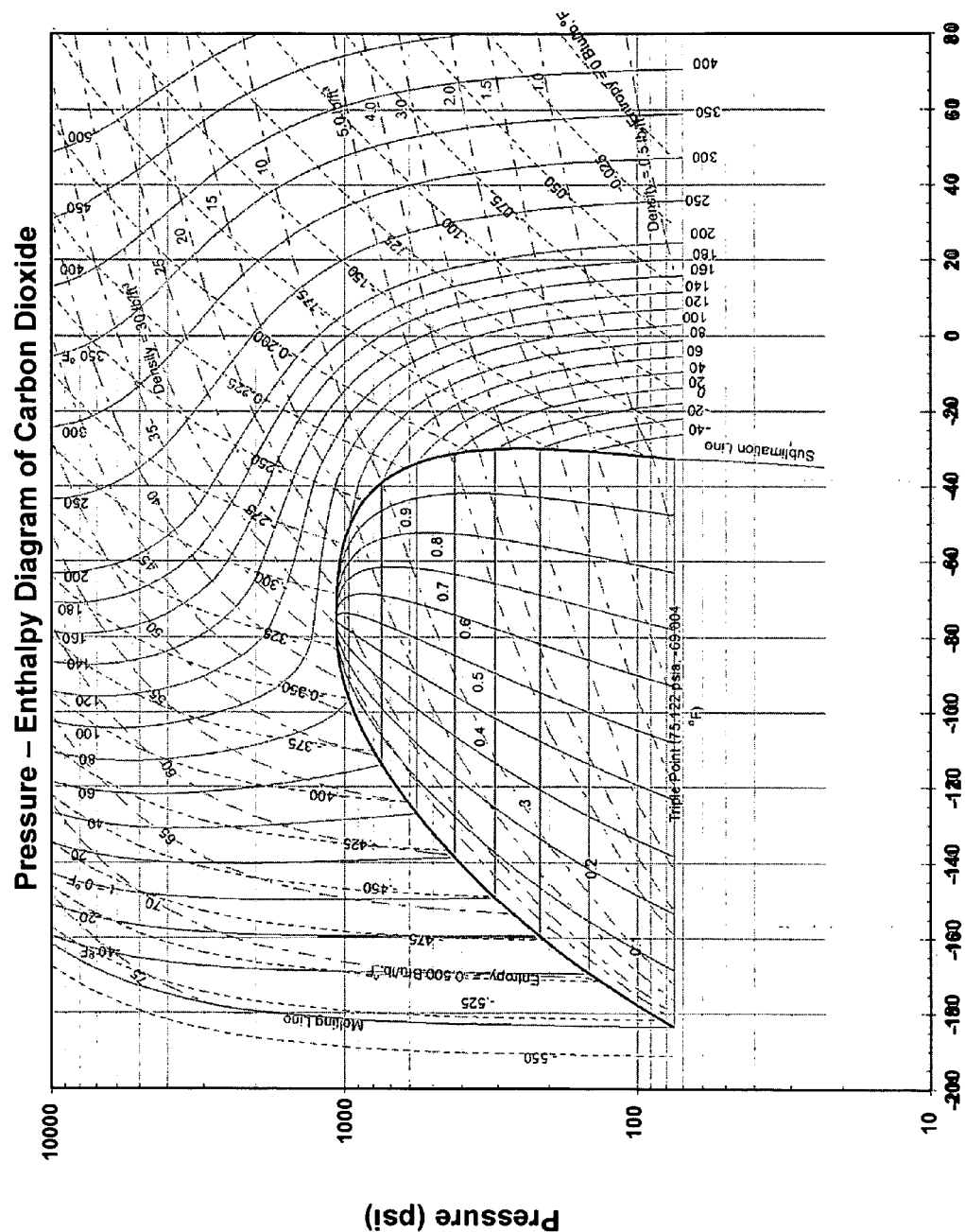
FIG. 3 depicts a graph depicting the pressure verses enthalpy relationship for carbon dioxide.

In the examples that follow a batch extraction system as shown in FIG. 1 was used. The cuttings samples were placed into the chamber and the chamber or cell was then sealed. Carbon Dioxide from a standard commercial cylinder was fed into the suction side of the pump. The pump was then switched on and the pressure of $CO_2$ was increased until it reached the critical point. The critical point of $CO_2$ is a function of temperature and pressure as is the critical point for any other solvent system. For $CO_2$ this dependence is shown in FIG. 2. FIG. 2 two is a standard phase diagram generally 200 for $CO_2$ is-shown-to include a vapor region 202, a liquid region 204, a solid region 206 and the critical point 208. Referring now to FIG. 3, a $CO_2$ pressure—enthalpy diagram generally is shown. The super critical fluid, $CO_2$, is fed into the extractor vessel whereupon the super critical fluid diffuses through the solids and removes the oil or hydrocarbons or other supercritical $CO_2$ soluble components, which contaminates the solid, into solution. The contaminants may be minerals, hydrocarbon (natural or synthetic). In the case of drilling fluid, the contaminants will also include additives to stabilize the drilling well fluids, including, without limitation, Polyalphaolefins, Acetals, Isomerised Olefins, Linear Alpha Olefins, Linear Alkylbenzenes, drilling muds or mixtures or combinations thereof or the like.

From the reactor vessel the solute loaded super critical fluid passes through a heated metering valve where it is depressurized and separation occurs, depositing the extracted oil and additives into the separation vessel. The super critical fluid (now in the gas phase) is exhausted to vent through a flow meter and totalizer. In a commercial full scale operation, the Carbon Dioxide gas or other fluid composition would be collected and fed back to the suction (low pressure) side of the pump, thereby creating a closed loop system. Samples of the extracted medium can be taken from the liquid phase to determine a desired degree of hydrocarbon removal. The chamber may require heating in certain circumstances.

The solid which was not taken into solution by the supercritical phase, remains in the reaction vessel for subsequent removal. After supercritical extration, the solid residue not only has reduced contaminants, preferably substantially no supercritically soluble contaminant, but is dry and a sterile.

Figure 4:
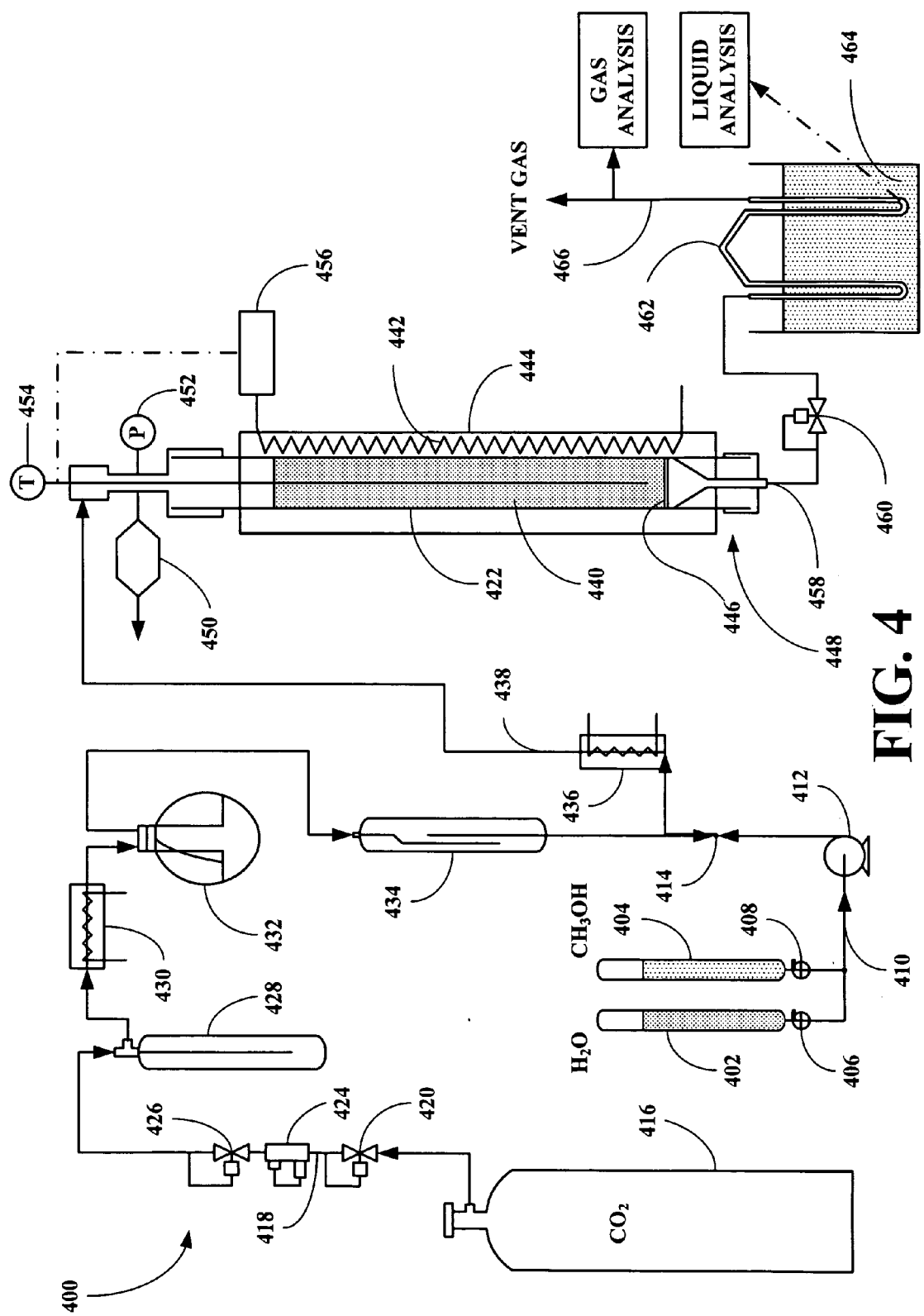
FIG. 4 depicts a schematic diagram of a preferred embodiment of a semi-batch apparatus for carrying out the process of this invention.

Referring now to FIG. 4, another preferred systems generally 400 for performing the extraction method of this invention is show where the extracting solvent is a mixture of carbon dioxide, pure water, and pure methanol. The pure water and pure methanol are contained in liquid form in feed reservoirs 402 and 404, respectively, having exit flow control valves 406 and 408, respectively. Liquid water and liquid methanol are introduced from reservoirs 402 and 404, respectively, into a liquid feed line 410. The water/methanol mixture is pumped through feed line 410 by means of a high pressure duplex reciprocating piston pump 412. This water/methanol mixture flows to a mixing tee 414.

Carbon dioxide is stored as a liquid under pressure in a pressure vessel 416, which may be a conventional gas cylinder. Carbon dioxide is withdrawn as a gas or vapor from the container 416 into a gas line 418. Carbon dioxide flow from the container 416 is controlled by a pressure regulator 420. The feed rate of carbon dioxide through the line 418 to the extractor 422 is controlled by a mass flow controller 424 and a control valve 426. Carbon dioxide is then passed through a pulse suppressor 428 and a feed pre-heater 430 to insure smooth flow of the carbon dioxide stream to a gas compressor 432. Carbon dioxide is then compressed in the gas compressor 432 and the flow of compressed carbon dioxide is stabilized by passing it through a flow stabilizer 434. The carbon dioxide stream flows from the stabilizer 434 to the mixing tee 414.

The carbon dioxide stream is then mixed with the methanol/water mixture in the mixing tee 414. The combined mixture is then pre-heated in a feed pre-heater 436 to a temperature close to but slightly below the desired reaction temperature. The heated solvent mixture is then fed via a solvent feed line 438 to the extractor 422, which has a fixed or stationary bed 440 therein. The fixed bed 440 is designed to contain an amount of a composition to be subjected to supercritical extraction, where the composition is either drilling solids from a centrifuge or drilling fluids directly for a well site.

The extractor 422 is of a generally vertical tubular shape—a vertically disposed tubular reactor, which is surrounded by a heating jacket 442 having an electric heater 444 positioned therein. A foraminous plate 446 at a bottom 448 of the extractor or reactor 422 supports the bed 440. The extractor 422 is provided with a rupture disc 450 and a pressure gauge 452. The extractor 422 is also provided with a temperature sensor or indicator 454, which indicates the temperature in the bed 440, and a temperature controller 456, which controls the current to the electric heater 444 in response to a reaction temperature as sensed by temperature indicator 454.

During extraction, the extractor is held under conditions of temperature and pressure sufficient to maintain the solvent at, near, but below or above the solvents critical point—maintained under near critical, critical or supercritical conditions—as it passes downwardly through the bed 440. The effluent exits the reactor 422 at an outlet 458 and the effluent will include the solvent and some or all components soluble in the solvent (depending on the degree of intended cleaning or treatment) from the material-to-be-treated in the bed 440 such as organics, inorganics or the other compounds soluble in the extraction solvent under near critical, critical or supercritical conditions. The rate of removal of the exiting solvent is controlled by a control valve 460, which may be a needle valve. The normally liquid components of the effluent, i.e., water, methanol, and liquids extracted by the solvent are condensed by passage through a tubular condenser 462. The condenser 462 is cooled by any suitable means such as a dry ice-acetone bath 464. The condensed liquids may be removed periodically (e.g., at the end of a run) from the condenser 462 for analysis. Uncondensed gases, typically carbon dioxide and normally gaseous hydrocarbons, are vented from the condenser 462 through a vent line 466. These gases may be analyzed as desired and the carbon dioxide recovered for recycling. Additionally, the volatile hydrocarbons can be collected for further processing. The calorific value of the vent gases in the line 464 may be recovered, e.g., by combustion of the gas mixture, where the calorific value is sufficient to justify this. Of course, if the above reaction system is run using only one solvent component, then the other solvent component feed lines are simply turned off or by-passed.

According to a preferred embodiment of a process of this invention, centrifuged drilling solids and/or fluids are charged to the reactor 422 prior to the start of a run. Water, methanol and carbon dioxide are fed to the reactor 422 in desired proportions, which can run from pure carbon dioxide, pure methanol, pure water or any mixture or combination thereof. The respective feed rates are controlled by means of the valves 406 and 408 and the mass flow controller 424. The solvent feed mixture is pre-heated in pre-heater 436 to a temperature just below the critical temperature of the solvent composition. The solvent mixture is passed downwardly through the bed 440 in the reactor 422, where it is operated under conditions of temperature and pressure sufficient to maintain the solvent near its critical point, at ites critical point or above its critical point—near critical condition, critical conditions or supercritical conditions—by means of external heat supplied by the electric heater 444. The effluent exiting the reactor 422 includes the solvent and all solvent soluble components with the solid being left in the bed 440 is continuously removed and is condensed as previously described. A run is allowed to proceed either for a predetermined length of time or for a length of time determined by some other parameter, such as instantaneous effluent analysis. Normally the solvent composition, i.e., the relative proportions of water, methanol and carbon dioxide, will remain constant throughout a run. This mode of operation may be described as semi-batch, since the solids and/or fluids are charged to and the solids are discharged from the extractor 422 before and after a run, respectively, in accordance with batch operation principles, while the solvent mixture is fed continuously throughout a run. Of course, the reaction can be run with non-continuous solvent feed, which would be under purely batch operating principles.

Semi-batch operation as described in FIG. 4 may be carried out in two or more stages, using solvents of different compositions in each stage. The solvent used in each stage may be Xe, $NH_3$, lower aromatic including benzene and toluene, nitrous oxide, water, CO, $CO_2$, $H_2O$, lower alcohols including methanol, ethanol, propanol, and isopropanol, lower alkanes including methane, ethane, propane, butane, pentane and hexane, petroleum ether, lower alkenes including ethylene and propylene or mixtures or combinations thereof. Using valves and flow controllers, an operator can pass a solvent of any desired composition into an appropriate extractor. When more than one stage is used, the first stage (the earliest portion of the run) typically uses the most volatile solvent (i.e., the solvent having the lowest critical temperature), and the solvent or solvent mixtures used in subsequent operating stages typically have progressively higher critical temperatures. However, each stage can use the same solvent composition.

Figure 6:
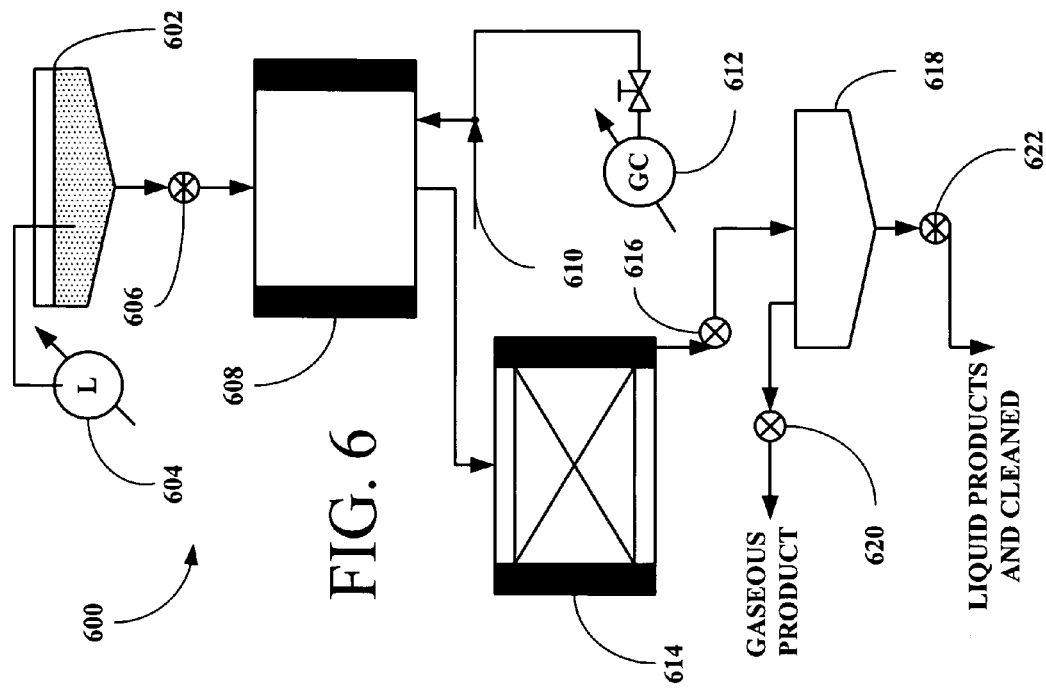
FIG. 6 depicts a schematic diagram of another preferred embodiment of a continuous apparatus for carrying out the process of this invention.
Figure 5:
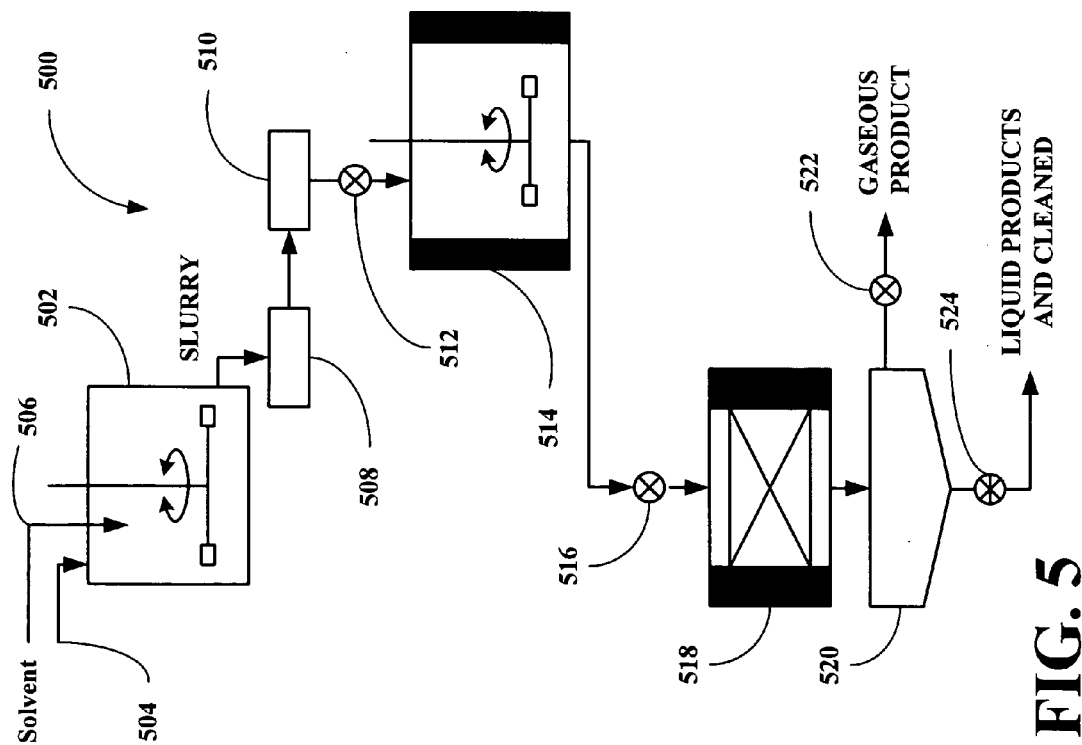
FIG. 5 depicts a schematic diagram of one preferred embodiment of a continuous apparatus for carrying out the process of this invention.

The present invention can also be operated under continuous operating conditions using reactors systems such as those illustrates in FIGS. 5 and 6. Referring now to FIG. 5, a preferred continuous system generally 500 for performing the extraction method of this invention is shown to include a stirred high-pressure vessel 502, which serves to mix the material-to-be-treated such as drilling fluids or a solids with the solvent. The material-to-be-treated and the supercritical extraction solvent are fed to the vessel 502 via a feed line 504 and a solvent feed line 506, respectively. The solvent entering through the line 506 is a solvent selected from the group consisting of Xe, $NH_3$, lower aromatic including benzene and toluene, nitrous oxide, water, CO, $CO_2$, $H_2O$, lower alcohols including methanol, ethanol, propanol, and isopropanol, lower alkanes including methane, ethane, propane, butane, pentane and hexane, petroleum ether, lower alkenes including ethylene and propylene or mixtures or combinations thereof. The resulting slurry, dispersion ro mixture is then pumped by a high-pressure slurry pump 508 through a feed preheater 510, which serves to heat up the mixture to a temperature just below the extraction temperature. The preheated feed is then admitted through a ball valve 512 or other similar device into a supercritical extractor 514 which is of the stirred reactor design, a mixing extruder, or other similar high shear mixing reactors. The mixture containing the extracted non-solid components is passed through a discharge valve 516 into a product cooler 518. The cooled product is next sent to a separating vessel 520 in which the gaseous product of extraction are separated from the cleaned solids and the liquid products. The gaseous product are either vented from the system 500 through valve 522 or separated to recover carbon dioxide or to a system to recover hydrocarbons or to recover fuel equivalents thereof. The solid and liquid products are removed through a valved discharge line 524.

Referring now to FIG. 6, another configuration for a continuous supercritical extraction system generally 600 for performing the extraction method of this invention is shown to include a storage hopper 602 containing a solid material-to-be-treated such as drilling solids, where a level of solids in the hopper 602 is controlled via a solid level indicator-controller 604. The solids are metered from the storage hopper 602 through a rotary air lock feeder 606 or via a screw type extruder or other similar apparatus into an extractor 608. A solvent mixture is fed into the extractor 608 through a solvent feed line 610. This solvent is selected from the group consisting of Xe, $NH_3$, lower aromatic including benzene and toluene, nitrous oxide, water, CO, $CO_2$, $H_2O$, lower alcohols including methanol, ethanol, propanol, and isopropanol, lower alkanes including methane, ethane, propane, butane, pentane and hexane, petroleum ether, lower alkenes including ethylene and propylene or mixtures or combinations thereof, which may be formed, pressurized and preheated to just below the critical temperature as described with reference to FIG. 5. The solvent can be analyzed for compositional makeup using a gas chromatograph 612. The system shown in FIG. 6 differs from that shown in FIG. 5 in that the system of FIG. 5 can be operated only co-currently, while the system of FIG. 6 can be operated either under counter-current or co-current flow conditions. A mixture of extracted and cleaned solids discharged from the extractor 608 is cooled in a product cooler 614 before being let down through a valve 616 into a product separating vessel 618. In this vessel, the gaseous products of extraction are separated from the cleaned solids and the liquid products. The gaseous product is then vented from the system through a valve 620. The cleaned solids and liquid products are discharged through a valve 622 and separated as described above.

Figure 7A:
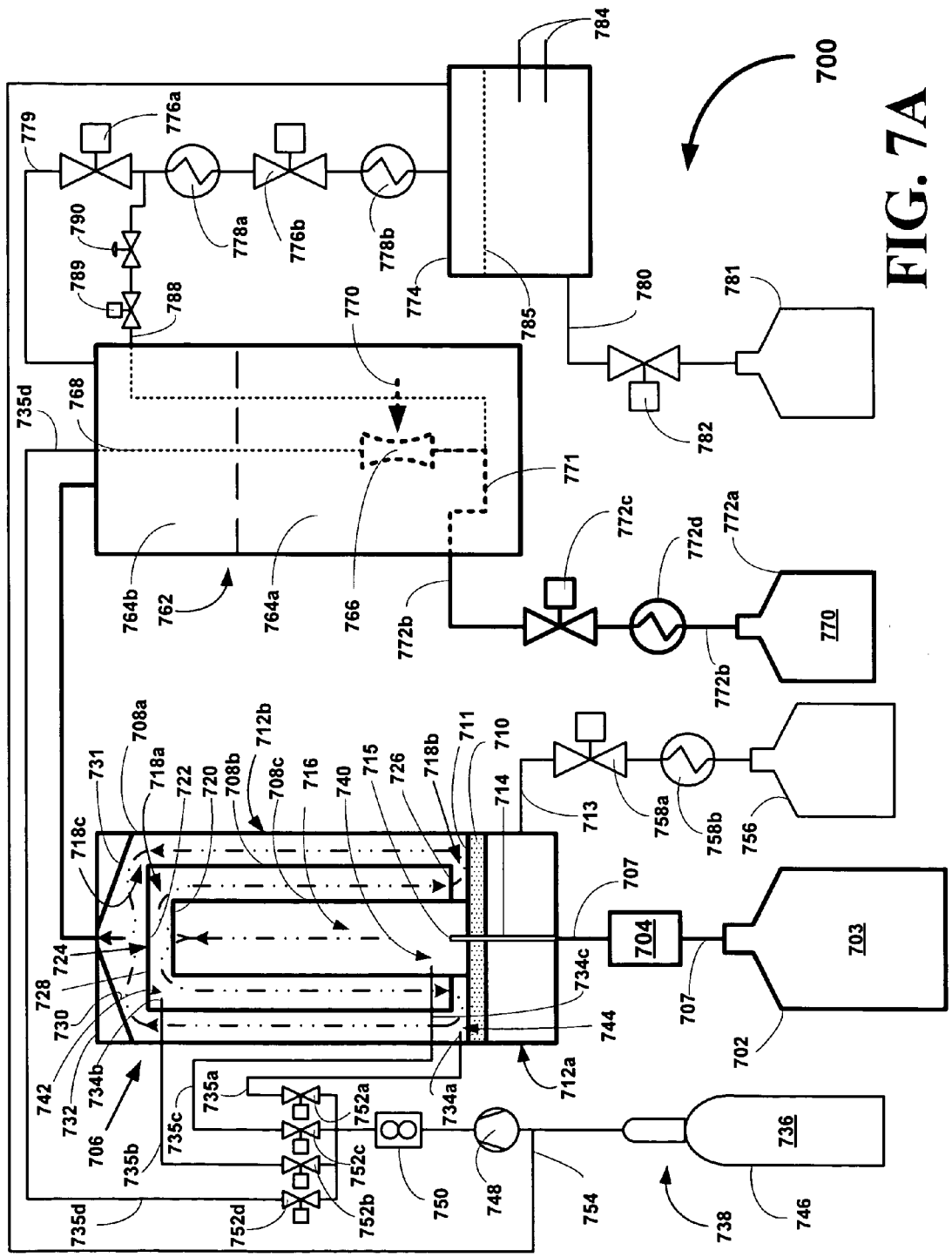
FIGS. 7A&B depict a schematic diagram of two preferred embodiment of a continuous apparatus for cleaning contaminated solid including drilling fluids, oil containing soils, or the like of this invention, where the extraction unit is shown in cross-section.

Referring now to FIGS. 7A&B, a preferred configuration for a continuous supercritical extraction system, generally 700, for performing the extraction method of this invention for solid and/or slurry materials is shown to include an input container 702 containing a solid material-to-be-extracted 703 such as drilling fluids.

The solids are metered from the container 702 through a control/metering system 704 into an extractor 706 via lines 707, where the control/metering system 704 can be a pump, a rotary air lock feeder, a screw type extruder, a value, or other control/metering apparatus. It the container 702 is pressurized, the controller 704 can be a remote controlled valve, but generally, the controller 704 is a pump.

The extractor 706 comprises a tube within a tube within a tube type extractor. The extractor 706 includes an outer column or tube 708a, a semi-permeable membrane 710, a lower section 712a and an upper section 712b. The upper section 712b includes a closed ended, inverted middle tube 708b and an inner tube 708c. The extractor 706 also includes a material-to-be-extracted inlet 714 connected to one of the lines 707 from the controller 704A. The inlet 714 passes through the membrane 710 delivering the material-to-be-extracted 703 into an interior 716 of the inner tube 708c from the container 702. The dashed lines with arrows indicate the direction of material flow in the extractor 706. The inner tube 708c extends upward to form a first gap 718a between a top 720 of the inner tube 708c and an inner surface 722 of the closed end 724 of the middle tube 708b. The middle tube 708b extends downward to form a second gap 718b between a top 711 of the membrane 710 and a bottom 726 of the middle tube 708b. While a third gap 718c is formed between an outer surface 728 of the closed end 724 of the middle tube 708b and an inner surface 730 of a top 732 of the column 708a. The inner surface 730 is shown here to include a tapered section 731 to improve material flow out of the extractor 706. The gaps 718a, 718b and 718c may have the same dimension or may have different dimensions and are designed to provide shear mixing of the material-to-be-extracted and the extracting fluid as the combined flow progressed through the extractor 706 along the path indicated by the dashed and arrowed lines.

The extractor 706 also includes extraction fluid inlets 734a, 734b and 734c adapted to supply an extraction fluid 736 from an extraction fluid supply system 738 to the extractor 706 via lines 735a–c. The inlet 734c supplies a first amount of extraction fluid 736 into the inner tube 708c at a position 740 near a top 715 of the inlet 714 via line 735c. The inlet 734b supplies a second amount of extraction fluid 736 via line 735b into the middle tube 708b at a position 742. The position 742 can be at any desired location along the middle tube 708b, but is preferably located near the gap 718b. The inlet 734a supplies a third amount of extraction fluid 736 via line 735a into the outer tube 708a at a position 744. Although the position 744 can be located anywhere along the column 708a, it is preferably located near the gap 718b.

Figure 7B:
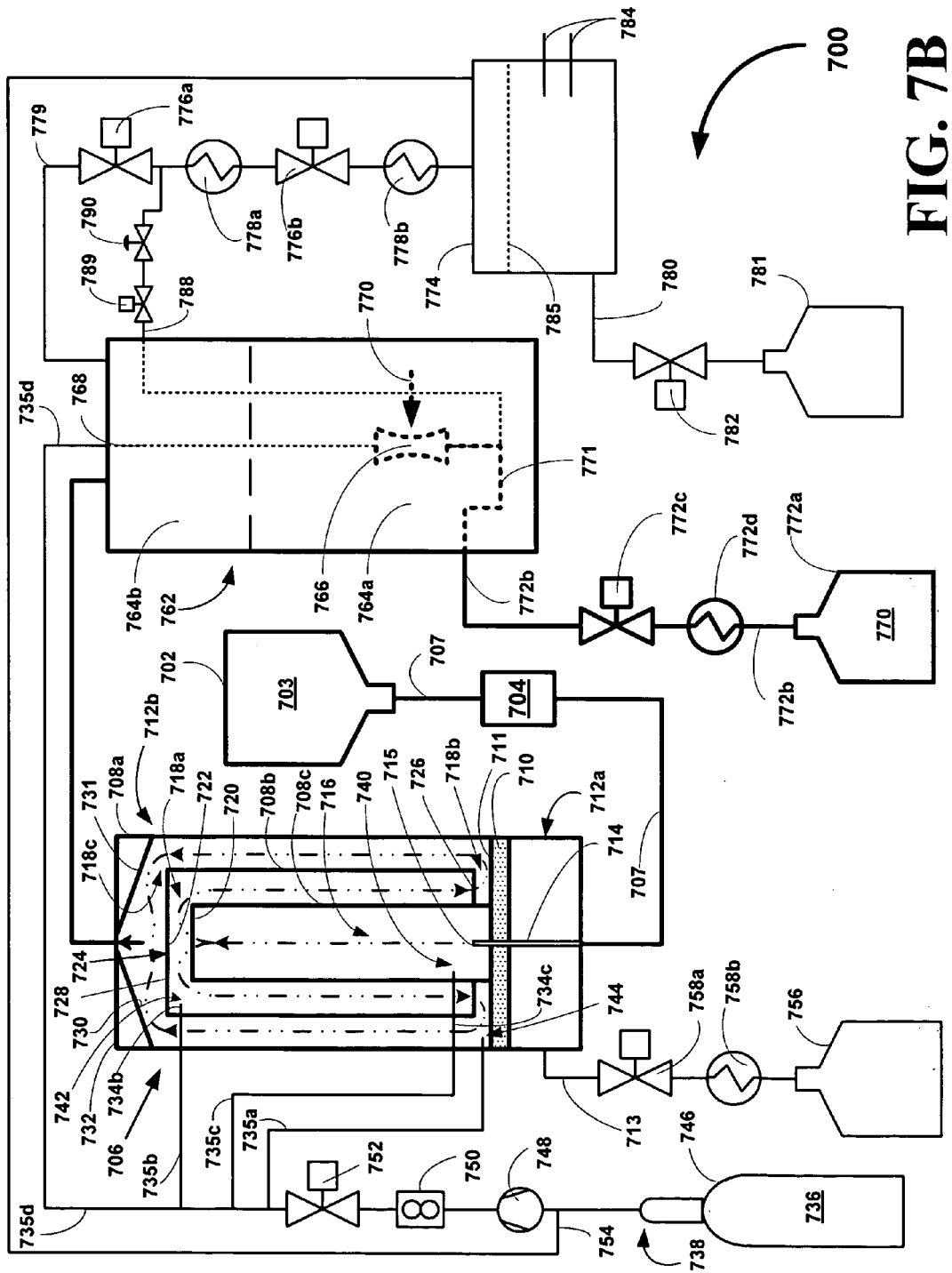

The supply system 738 includes an extraction fluid storage tank 746, a compressor 748, and a mass controller 750. The compressor 748 compresses the extraction fluid 736 to a desired pressure, which is preferably a pressure that is sufficient to maintain the extraction fluid in the extractor to be at or above the supercritical point for the particular extraction fluid being used. Looking at FIG. 7A, the system 738 also includes separate valves 752a–c for controlling the first, second, and third amount of extracting fluid flowing into the extractor 706 through lines 735a–c and a fourth valve 752d controlling the amount of extraction fluid 736 supplied, via line 735d, to a venturi valve described below. Looking at FIG. 7B, the system 738 includes only a single valve 752 for controlling the amount of extracting fluid flowing into the extractor 706 through lines 735a–c and into the venturi valve via line 735d. In both FIGS. 7A&B, the supply system 738 also includes a recycle line 754.

As the material-to-be-extracted 703 is being feed and mixed with the extraction fluid 736, any water and materials dissolved in the water migrate across the membrane 710 into the lower section 712a and exit the extractor 706 via a line 713 to an aqueous phase storage tank 756 via a control valve 758a and a heat exchanger 758b, where the control valve 758a reduces the pressure to ambient pressure.

After the material-to-be-extracted 703 has been mixed with the three portions of extraction fluid 736 in the extractor 706, the combined mixture exits the extractor 706 via exit line 760 which interconnects the extractor 706 with a first separator 762. The separator 762 allows the solids to sink to a bottom section 764a of the separator 762, while the fluids occupy a top section 764b of the separator 762. The separator 762 also includes a venturi valve 766 connected to an extraction fluid input 768 connected to the supply line 735d from the extraction supply system 738. As the extraction fluid 736 travels through the venturi value 766, the solids 770 are pulled into the venturi valve 766 and exit the separator 762 to a solids recovery system 772 via a solids outlet 771. The solids recovery system includes a solids storage vessel 772a connected to the separator 762 via lines 772b having a pressure reducing control valve 772c and a heat exchanger 772d. The separator 762 can also include a by-pass outlet 769 for the extraction fluid supplied to the venturi valve 766 via inlet 768.

The liquids, oils and extraction fluid, from the first separator 762 are forwarded to a second separator 774 through two pressure-reducing control valves 776a&b and two heat exchangers 778a&b via lines 779. The second separator 774 includes hydrocarbon liquid exit line 780 connected to a hydrocarbon storage vessel 781 via control valve 782. The second separator 774 also includes probes 784, that determine the liquid level 785 in the separator 774, and an extraction fluid exit 786 connected to the extraction fluid recycle line 754. Additionally, the extraction fluid by-pass outlet 769 from the venturi valve 766 is directed via line 788 to a by-pass valve 789 and a regulator valve 790 and combined with the liquids from the first separator 762 at the heat exchanger 778a.

The preferred extraction fluid for use in the extraction system 700 is pure carbon dioxide, but the extraction fluid can be selected from the group consisting of Xe, $NH_3$, lower aromatic including benzene and toluene, nitrous oxide, water, CO, $CO_2$, $H_2O$, lower alcohols including methanol, ethanol, propanol, and isopropanol, lower alkanes including methane, ethane, propane, butane, pentane and hexane, petroleum ether, lower alkenes including ethylene and propylene or mixtures or combinations thereof, which may be formed, pressurized and preheated to just below the critical temperature as described with reference to FIG. 5.

The apparatus of the present invention can be located remote from the drilling site or can be integrated into the drill complex. Thus, an off-shore drilling platform could have an extraction unit built onto the pumping system for the drilling fluids so that the solids and aqueous components could be separated on the hydrocarbon components which would include mud ingredients could be fed back into the downhole fluid stream.

Figure 8A:
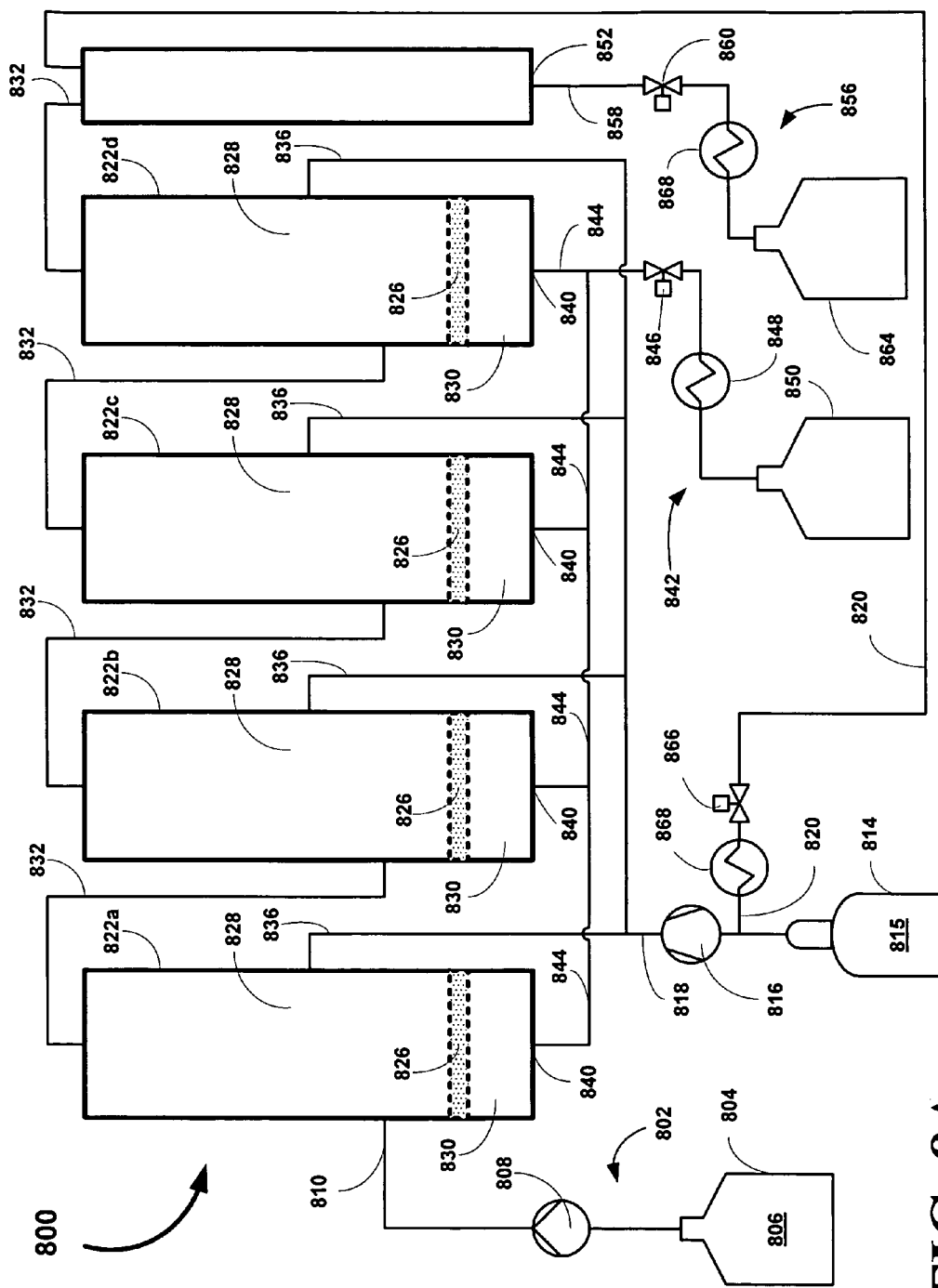
Figure 8B:
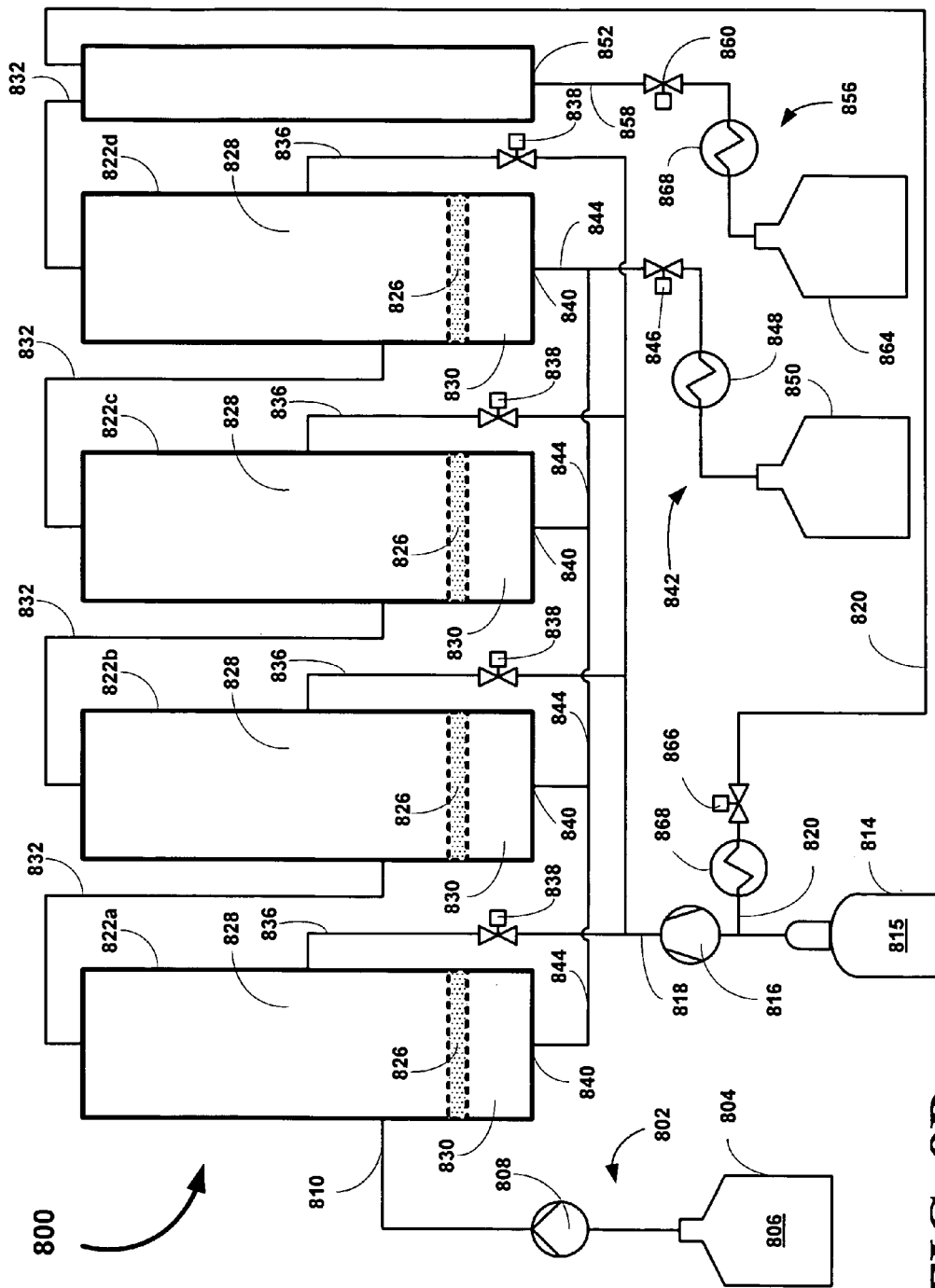

Referring now to FIG. 8A, a preferred configuration of a continuous supercritical extraction system generally 800 of this invention for cleaning and/or desulfurizing liquids with only minor amount of solids therein, such as used motor oils or fuels, is shown to include a material-to-be-treated supply system 802. The material-to-be-treated supply system 802 includes a material-to-be-treated reservoir 804 containing the material-to-be-treated 806, a pump 808 or any other apparatus for transferring a liquid material and a feed line 810.

The system 800 also includes an extracting fluid supply system 812. The extraction fluid supply system 812 includes an extracting fluid reservoir 814 containing an extraction fluid 815, a compressor 816, an extraction fluid feed line 818 and a recycle line 820.

The system 800 is a multi-staged extraction/cleaning system shown in FIG. 8A to have four extractors 822a–d in series and a separator 824. Each extractor 822 includes a membrane 826 separating each extractor 822 into an upper section 828 and a lower section 830. The membranes 826 allow water and polar compounds to migrated from the upper section 828 of each extractor into the lower section of each extractor. The first extractor 822a is connected to the material-to-be-treated feed line 810, while the other three extractors 822b–d include a forwarding line 832, which feeds the extractors 822b–d with the contents of the upper section 828 of the preceding extractor 822a–c, i.e., the contents of the upper section 828 of the extractor 822a is the feed for the extractor 822b via forwarding line 832 and so on. Finally, the contents of the upper section 828 of the extractor 822d are forwarded to the separator 824 via a separator feed line 834. Each extractor 822 also includes an extractor feed line 836 connected to the feed line 818. Looking at FIG. 8B, each feed line 836 includes a separate flow controlling valve 838, where the valves 838 allow the amount of extraction fluid 815 entering each extractor 822a–d to be separately controlled so that the amount of extraction fluid 815 being supplied to each extractor 822a–d can be different. Each extractor 822a–d also includes an aqueous phase outlet 840 connected to a waste aqueous storage system 842 via waste lines 844. The storage system 842 includes a pressure reduction valve 846 and a heat exchanger 848 to reduce the pressure to ambient pressure and allow the temperature to warm to room temperature and a waste water storage container 850. The waste water can be forwarded to a water treatment facility for further processing.

The separator 824 includes a finished product outlet 852 and an extraction fluid outlet 854. The finished product outlet 852 is connected to a finished product storage system 856 via finished product line 858. The finished product storage system 856 includes a pressure reduction valve 860 and a heat exchanger 862 to reduce the pressure to ambient pressure and allow the temperature to warm to room temperature and a finished product storage container 864. The extraction fluid outlet 854 is connected to the recycle line 820 passing through a pressure reduction valve 866 and a heat exchanger 868 to reduce the pressure to ambient pressure and allow the temperature to warm to room temperature prior to mixing with the fresh extraction fluid going into the compressor 816.

In the following detailed description of FIGS. 9A&B, two preferred reactor schematics are shown for a continuous process for separating oil and other organics (water insoluble compounds) from mixtures including solid, water and oil or other organics. The mixture can be any mixture derived from oil and/or gas exploration and/or productions such as fresh drilling fluids, used drilling fluid (drilling fluids including cutting and other solid materials entrained in the drilling fluid during drilling operations), waste pit materials which generally includes oils and/or other organics, water, and solid such as soil, cuttings, or other solid materials.

The reactors schematics shown below are similar to the reactor schematic of FIGS. 8A&B combined with FIGS. 7A&B. The reactor system includes an extraction fluid supply system, a material-to-be-treated supply system, a reactor system and two or three recovery systems depending on the type of material the user wishes to recover. If the user desires to recover an organic fraction (hydrocarbons and other substantially water insoluble organics), an aqueous fraction and a dry solids fraction, then the user would use the reactor system shown in FIG. 9A. If the user desires to recover only an organic fraction and a mixed fraction of water, water soluble materials and solids, then the user would use the reactor system shown in FIG. 9B.

Figure 9A:
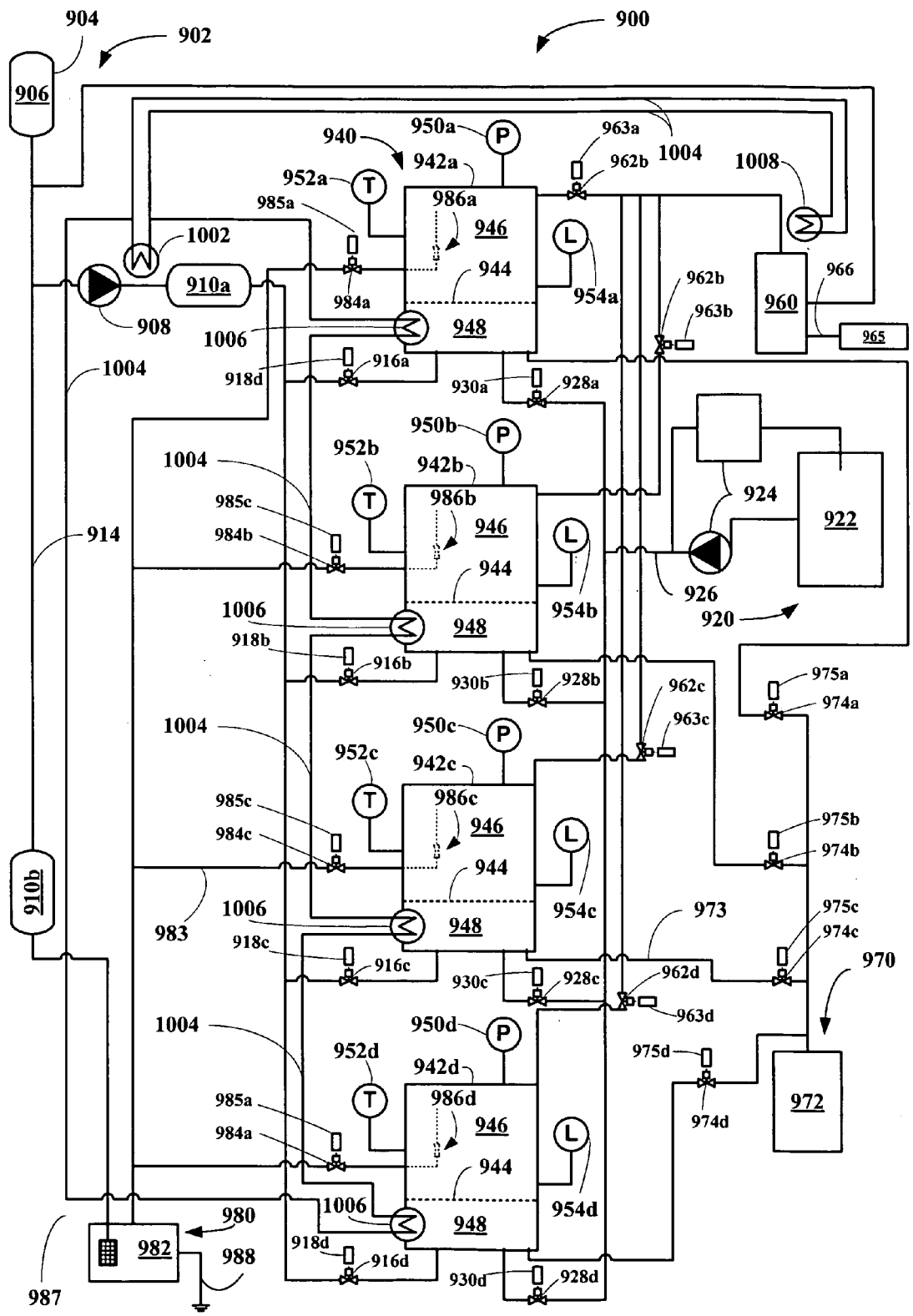
FIG. 9A depict a schematic diagram of a preferred embodiment of a continuous multi-staged apparatus of this invention for cleaning a composition including a solid material, water, and a hydrocarbons or substantially water insoluble organics to form a hydrocarbon or organic residue substantially free of solids and/or water, a water residue substantially free of solid material and hydrocarbon, and a solid residue substantially free of water and hydrocarbon.
Figure 9B:
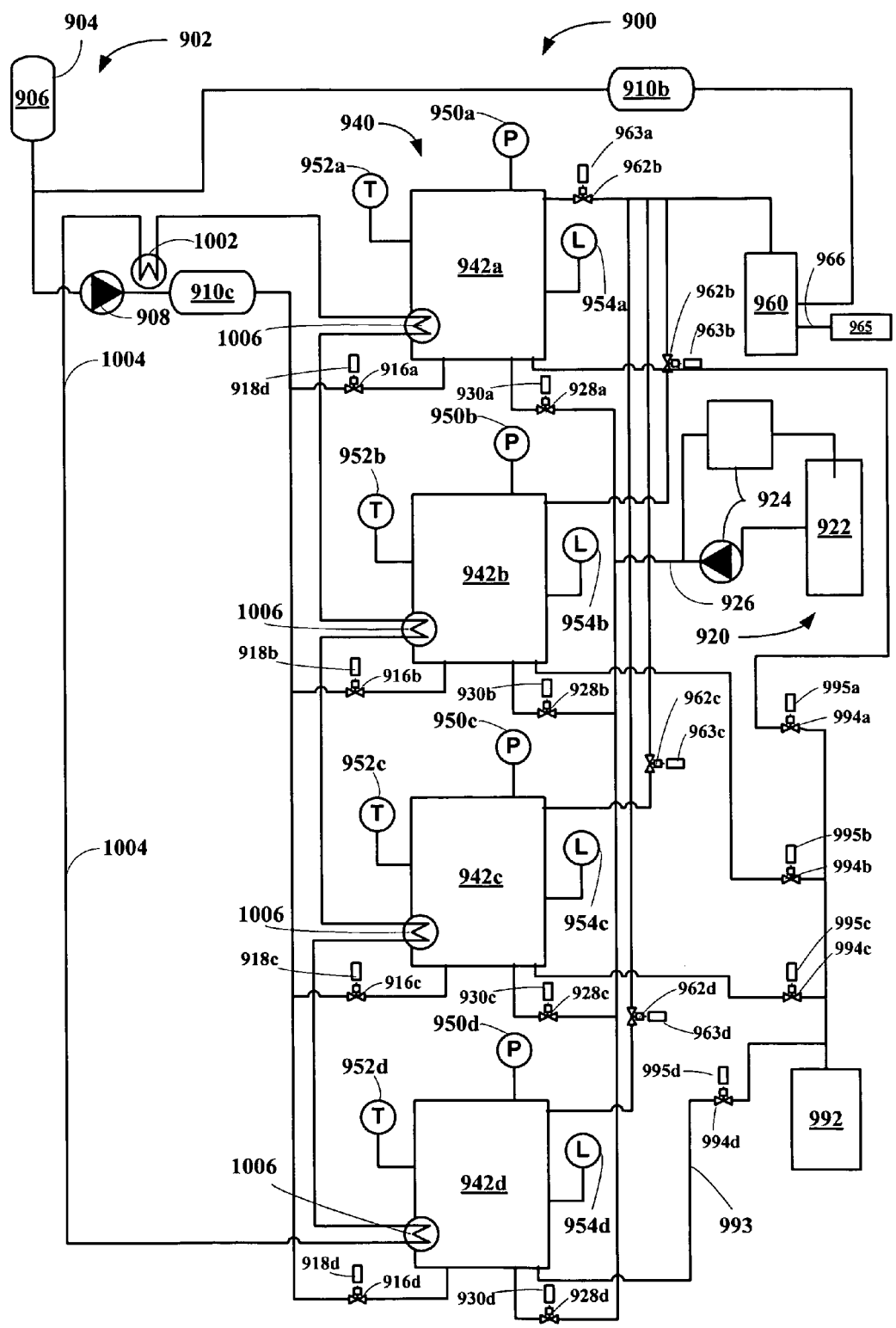
FIG. 9B depict a schematic diagram of a preferred embodiment of a continuous multi-staged apparatus of this invention for cleaning a composition including a solid material, water, and a hydrocarbons or substantially water insoluble organics to form a hydrocarbon or organic residue substantially free of solids and/or water and a mixture of water and the solid material.

As will be discussed below, the advantage of using the reactor system of FIG. 9B, is that with sufficient heating of the mixed fraction as it is withdrawn from the reactor, each reactor can be run on a continuous basis, without having to have a staged four reactor system configuration with each individual reactor running in a batch mode. It should also be recognized that with sufficient heating of the reactor components associated with each fraction withdrawal system, each reactor can be run continuously. However, for convenience and operational expediency, a staged reactor system may have advantages because the staging can be adjusted so that one reactor can be taken off line without significantly affecting the through put of the system.

Although a four reactor system is shown below, the preferred number of reactors can range from 1 to about 12 or higher, with 2 to 10 being preferred, 3 to 8 being particularly preferred and 4 to 8 being especially preferred. When the reactor system is run as a group of batch reactors, the sequence of events for each reactor is staggered so that the entire process is continuous. Although the reactors can be scaled to any desired size and can have any desired properties, one preferred reactor design has the following properties or characteristics:

| Property/Characteristic | Value | Property/Characteristic | Value |
| --- | --- | --- | --- |
| Max. Working Pressure | 4,000 psig | Working Volume | 94 gallons |
| Height | 48 inches | Freeboard Volume | 47 gallons |
| Diameter | 24 inches | Plenum under filter Volume | 11.75 gallons |
| Freeboard | 24 inches[a] | 1/2 inch Outlets | 7 |
| Plenum number Filter | 6 inches[a] | 1 inch Outlets | 1 |
| Parallel sides Max Height | 78 inches | 1 1/4 inch Outlets | 1 |
| Parallel sides Max ID | 24 inches | 1 1/2 inch Outlets | 1 |

[a]measured to dish shoulder

Using these reactor and system specifications, the reactor cycle process is as follows: (1) 12 minute fill time @ 8 gpm (gallons per minute); (2) 3 minutes pressurization time; (2) 3 minute process time; and (4) 12 minute discharge time. These times give rise to a per reaction cycle time of 30 minutes. Thus, in a four reactor system, one reactor can be undergoing the process of each of the four steps so that the entire process is continuous and stagged. Of course, for 2 to 10 reactors, the start times of each reactor can be staged to allow continuous processing. Although an 8 gpm fill rate and discharge rate are preferred, in practice the fill and discharge rates can be varied considerably from about 4 gpm to about 20 gpm or lower or higher, preferably from about 6 to about 16, particularly from about 6 to about 12 and more particularly from about 6 to about 10.

The reactor systems of FIGS. 9A&B are designed to operate at pressures between about 800 psig (subcritical) to about 4000 psig (supercritical) at a temperature between about 10° C. and about 100° C., preferably between about 20° C. and about 50° C., particularly, between about 20° C. and about 40° C. and more particularly between about 20° C. and about 30° C. or ambient. Although each reactor can be designed to run continuously at pressure, potential difficulties can arise due to expansive cooling and the formation of solid water or extraction fluid (e.g., dry ice formation) during discharge or removal of desired materials. These potential difficulties can be overcome in at least two principle ways: (1) provide sufficient heat to each fraction recovery system to prevent or reduce ice formation or (2) reduce the pressure to below about 800 psig prior to discharge. At pressure between about 600 psig and 800 psig, ice formation (water or carbon dioxide) is greatly reduced and smaller heat exchanger can be used to prevent ice formation.

The process by which the reactors system operates in a batch mode involves using control values controlled by a controller attached either to a manual control console or a computer control console running scada processing systems as is well known in the art, with the computer control console being preferred with software sufficient to set, monitor, change and control reactor system parameters including the timing of opening and closing valves. At the start of each reactor cycle, the discharge valves of each reactor are closed via their controllers under computer or operator control.

First, fill valve associated with the material-to-be-treated supply system is opened via its controllers under computer or operator control, and the reactor is filled with the appropriate amount of material-to-be-treated at a pressure below a pressure that would cause ice formation. After the material-to-be-treated has been charged, the material-to-be-treated fill valve is closed via its controllers under computer or operator control, and the fill valve associated with the extracting fluid supply system is then opened via its controllers under computer or operator control and at operating pressure. After the extracting fluid has been charged to the reactor, the extraction fluid fill valves is closed via its controllers under computer or operator control. All values remained closed during the extraction process, where non-aqueous fluids are separated from solids and aqueous fluids. After the extraction time has elapsed, the pressure is lowered to a pressure below the critical pressure of the extracting fluid (generally at or below about 750 psig) and the fraction dispatch valves are opened via their controllers under computer or operator control is a given sequence.

Although the exact sequence is not critical, the preferred sequence of opening of the discharge valves is the non-aqueous (organics and extracting fluid) fraction first by opening and then closing its discharge valve via its controllers under computer or operator control. Next, the aqueous fraction second by opening and then closing its discharge valve via its controllers under computer or operator control, and followed by a dry, powdered solids fraction which is discharged by opening and then closing its discharge valve via its controllers under computer or operator control aided by a venturi valve in the reactor. Each reactor includes a water permeable screen member and/or membrane member in a lower section of the reactor so that the aqueous fraction goes into a lower portion of the reactor below the membrane and/or screen, the solid stay on the top of the member and the non-aqueous fraction occupies an upper portion of the reactor above the member. After the fractions have been discharged and their discharge valves opened and closed in the desired sequence via their controllers under computer or operator control, the process starts all over again. By staggering the cycle process for each reactor, the four reactors operate similar to an internal combustion engine where a sequence of pistons impart torque to the crank shaft in consecutive combustion events.

For reactor or reactor systems that do not require separation of the aqueous fraction from the solids fraction, but only require remove of all non-aqueous components of the material-to-be-treated, the water permeable member and the venturi valve and associated lines are removed, which converts the reactor from a three fraction discharge configuration to a two fraction discharge configuration. In the two fraction discharge configuration, reactor charging proceeds exacting as above, which is the preferred manner of charging, because the material-to-be-treated is charged under relatively low pressure. Although high pressure charging of the material-to-be-treated is difficult because of the variability of the composition and its handling characteristics and the difficulty in equipment behavior for charging such material at high pressure. Of course, the pressure in each reactor can be raised or lowered during the course of the extraction process by adding or removing extracting fluid. Once charging and extraction are complete, the order of discharge is preferably the non-aqueous fraction first (organics and extracting fluid) and slurry second (water and solids). It should be obvious to an ordinary artisan that the aqueous phase will migrate to a lower portion of the reaction due to density as well the solid material.

Referring now to FIG. 9A, a preferred configuration of a continuous extraction system generally 900 of this invention for cleaning solids such as drilling fluids including fluids that aid in the drilling operation and the fluids return from down hole which include solids, water and oil, is shown to include an extraction fluid supply system 902, a material-to-be-treated supply system 920, a reactors system 940, an oil recover system 958, a water recovery system 970 and a solids recovery system 980. While FIG. 9B, shown another preferred continuous extraction system 900 includes the extraction fluid supply system 902, a material-to-be-treated supply system 920, a reactors system 940, an oil recover system 958, and a water-solids mixture recovery system 990. It should be recognized that although supercritical extraction is preferred, the reactor systems can be operated at sub-critical, critical and super-critical conditions. The reactor systems of FIGS. 9A&B also include a heat exchange system 1000 for exchanging heat between the extraction fluid compression step (exergonic or exothermic) and the discharge fraction step (energonic or endothermic).

The extraction fluid supply system 902 includes an extracting fluid supply reservoir 904 containing an extraction fluid 906, an intensifier 908 for comprising the extracting fluid to a desired pressure, a pressurized extracting fluid reservoir 910a, extraction fluid feed lines 912, low pressure extraction fluid recycle lines 914, and a low pressure recycle extracting fluid reservoir 910b. The supply system 902 also includes extracting fluid charging control valves 916a–d and associated controllers 918a–d.

The material-to-be-treated supply system 920 includes a material-to-be-treated supply reservoir 922, a pressurization system 924 for charging the material-to-be-treated via material-to-be-treated supply lines 926. The supply system 920 also includes material-to-be-treated charging control valves 928a–d and associated controllers 930a–d.

The reactors system 940 including four reactors or extractors 942a–d in parallel. Each reactor 942 includes a membrane 944 separating each reactor 942 into an upper section 946 and a lower section 948. The membranes 944 allow water and polar compounds to migrated from the upper section 946 of each reactor 942 into the lower section 948 of each reactor 942. Each reactor 942a–d is connected to the extracting fluid supply system 902 via supply lines 912, where charging is controlled by the control valves 916a–d and associated controllers 918a–d. Each reactor 942a–d is also connected to the material-to-be-treated supply system 920 via supply lines 926, where charging is controlled by the control valves 928a–d and associated controllers 930a–d. As stated above, the control valves 916a–d and 928a–d and their associated controllers 918a–d and 930a–d are timed to open so that the material-to-be-extracted is charged first at a low pressure, followed by high pressure charging of the extracting fluid. Once charged, each reactor 942 is held at pressure for a specified period of time at ambient temperature (preferred, although higher and lower temperatures can be used with concurrent pressure adjustment) to promote complete extraction. Of course, the reactors 942 can also, and preferably do, include pressure sensors 950a–d, temperatures sensors 952a–d and level sensors 954a–d.

The oil recover system 958 includes a non-aqueous or oil fraction outlet 959 connected to a separation tank 960 via oil fraction recovery lines 961 including an oil fraction discharge valves 962a–d and their associated controllers 963a–d. The separator tank 960 allows the extraction fluid to transition to the gas phase and includes an oil outlet 964 connected to a finished product storage system 965 via finished product line 966. The tank 960 also includes an extracting fluid outlet 967 which is connected to the extraction supply system 902 via return lines 968.

The water recovery system 970 includes an aqueous fraction outlet 971 connected to an aqueous fraction storage tank 972 via aqueous fraction recovery lines 973 including aqueous fraction discharge valves 974a–d and their associated controllers 975a–d.

The solids recovery system 980 includes a solids fraction outlet 981 connected to a separation tank 982 via solids fraction recovery lines 983 including solids fraction discharge valves 984a–d and their associated controllers 985a–d and venturi valves 986a–d located inside the upper section 946 of the reactors 942. The separator tank 982 includes an extracting fluid outlet 987 connected to the recycle lines 914 and a solids outlet 988.

Referring to FIG. 9B, the reactors 942 do not include the membrane 944, the aqueous recovery system 970 and the solids recovery system 980. Instead, the water recovery system 970 and the solids recovery system 980 are combined into a single water-solids mixture recovery system 990, where the system 990 includes a mixed fraction outlet 991 connected to a storage tank 992 via mixed fraction recovery lines 993 including mixed fraction discharge valves 994a–d and their associated controllers 995a–d.

In addition to the features and aspects of the reactor systems of FIGS. 9A&B, the reactor system also include a heat exchange system 1000. The heat exchange system 1000 is adapted to utilize the heat generated during the extraction fluid compressing step to warm the reactor systems and recovery lines during the discharge process. The heat exchange system 1000 includes a first heat exchanger 1002 associated with the intensifier 908 for withdrawing heat generated in the compression step and carrying the heat via a heat exchange fluid through heat exchange lines 1004 to reactor heat exchangers 1006 and recovery line heat exchangers 1008. Thus, heat generated in transitioning the low pressure extracting fluid (gas) to high pressure extracting fluid (liquid) is used to counteract the cooling due to the transition of the extracting fluid from its high pressure state (liquid) to its low pressure state (gas), preventing ice and/or dry ice formation in the reactor or discharge lines or valves during the discharge process.

Although any extraction fluid described in this invention can be used in the systems of FIGS. 7A&B, 8A&B and 9A&B, the system preferably uses pure carbon dioxide.

Additionally, if carbon dioxide is used in the extraction solvent composition, then any of the previously described installation can be equipped with a low temperature separator for separating carbon dioxide out of the atmosphere. Additionally, the apparatus can have recycling equipped to recover the extraction solvent for recycling.

EXPERIMENTAL RESULTS

The supercritical extraction solvent used in the following examples was standard commercial grade Carbon Dioxide, from a stock cylinder. The type of cell used in the following examples was an 8 mL stainless steel view cell. The pump type used in the following examples was a Milton Roy 100 ml/hour max, positive displacement pump. The samples used in the following examples was a sample as received from Baker Hughes and was centrifuged cuttings from well fluids. In all of the examples the follow, the oil removal % was estimated or derived by sight only.

Example 1

This example illustrates the cleanup of a sample of oil laden solids obtained after well fluids are subjected to centrifugation under supercritical conditions using $CO_2$ at 3,500 psi.

The supercritical extraction cell and pipework were cleaned with acetone. 1 g of the sample was placed in the cell and the cell was reassembled. The cell was then placed into supercritrical pipe circuit. The cell and pipework were flushed twice with stock Carbon Dioxide. The pressure was then increased to about 3,500 psi at ambient temperature. No color change in liquid phase was noted. The pressure was held at about 3,500 psi pressure for about 1 hour and 20 minutes. The total oil removed from the sample was about 99%. The solid material had a slight hydrocarbon sent, but dry to the touch.

Example 2

This example illustrates the cleanup of a sample of oil laden solids obtained after well fluids are subjected to centrifugation under supercritical conditions using $CO_2$ at 1,000 psi and at 25° C.

The cell was cleaned and prepared as described in Example 1. After preparation, the pressure was increased to about 1000 psi at a temperature of about 25° C. The pressure and temperature were maintained for about 1 hour. Under these conditions only partial oil removal was achieved with the recovery being about 60%.

Example 3

This example illustrates the cleanup of a sample of oil laden solids obtained after well fluids are subjected to centrifugation under supercritical conditions using $CO_2$ at 2,000 psi and at 27.8° C.

The cell was cleaned and prepared as described in Example 1. After preparation, the pressure was increased to about 2000 psi at a temperature of about 27.8° C. The pressure and temperature were maintained for about 20 minutes. Under these conditions only partial oil removal was achieved with the recovery being about 85%.

Example 4

This example illustrates the cleanup of a sample of oil laden solids obtained after well fluids are subjected to centrifugation under supercritical conditions using $CO_2$ at 2,500 psi and at 22.5° C.

The cell was cleaned and prepared as described in Example 1. After preparation, the pressure was increased to about 2500 psi at a temperature of about 22.5° C. The pressure and temperature were maintained for about 10 minutes. Under these conditions only partial oil removal was achieved with the recovery being about 95%.

Example 5

This example illustrates the cleanup of a sample of oil laden solids obtained after well fluids are subjected to centrifugation under supercritical conditions using $CO_2$ at 3,500 psi and at 43° C.

The cell was cleaned and prepared as described in Example 1. After preparation, the pressure was increased to about 3500 psi at a temperature of about 43° C. The pressure and temperature were maintained for about 5 minutes. Under these conditions only partial oil removal was achieved with the recovery being about 95%.

Example 6

This example illustrates the cleanup of a sample of oil laden solids obtained after well fluids are subjected to centrifugation under supercritical conditions using $CO_2$ at 2,500 psi and at 43° C.

The cell was cleaned and prepared as described in Example 1. After preparation, the pressure was increased to about 2500 psi at a temperature of about 43° C. The pressure and temperature were maintained for about 5 minutes. Under these conditions only partial oil removal was achieved with the recovery being about 95%.

Example 7

This example illustrates the cleanup of a sample of oil laden solids obtained after well fluids are subjected to centrifugation under supercritical conditions using $CO_2$ at 2,500 psi and at 23° C.

The cell was cleaned and prepared as described in Example 1. After preparation, the pressure was increased to about 2500 psi at a temperature of about 23° C. The pressure and temperature were maintained for about 5 minutes. Under these conditions only partial oil removal was achieved with the recovery being about 97%.

Example 8

This example illustrates the cleanup of a sample of oil laden solids obtained after well fluids are subjected to centrifugation under supercritical conditions using $CO_2$ at 2,500 psi and at 23° C.

The cell was cleaned and prepared as described in Example 1. After preparation, the pressure was increased to about 2500 psi at a temperature of about 23° C. The pressure and temperature were maintained for about 2 minutes. Under these conditions only partial oil removal was achieved with the recovery being about 80%.

Example 9

This example illustrates an analysis of a used oil after supercritical cleanup using the apparatus of this invention and $CO_2$ as the extracting fluid.

The following table lists the properties of the treated oil:

| Test | Common Name | Test Units | Results |
| --- | --- | --- | --- |
| ASTM D 482-95 | Viscosity Index | wt % | 0.365 |
| ASTM D 93 | Flash Point by PMCC | ° F. | 230+ |
| ASTM D 1296-99 | API Gravity @ 60° F. | °API | 28.8 |
| ASTM D 4077 | Water Content | vol % | 6.32 |
| ASTM D 445 | Kinematic Viscosity @ 100° F. | cSt | 24.470 |
| ASTM D 4294-98 | Total Sulfur | wt % | 0.327 |

Example 10

This example illustrates the comparison of used oil before and after supercritical cleanup using the apparatus of this invention and $CO_2$ as the extracting fluid.

The following table lists the properties of the oil before treatment:

| Test | Common Name | Test Units | Results |
| --- | --- | --- | --- |
| ASTM D 482-95 | Ash Content | wt % | 0.365 |
| ASTM D 93 | Flash Point by PMCC | ° F. | 230+ |
| ASTM D 1296-99 | API Gravity @60° F. | °APL | 28.8 |
| ASTM D 4077 | Water Content | vol % | 6.32 |
| ASTM D 445 | Kinematic Viscosity @100° F. | cSt | 24.470 |
| ASTM D 4294-98 | Total Sulfur | wt % | 0.327 |

The following table lists the properties of the oil after treatment:

| Test | Common Name | Test Units | Results |
| --- | --- | --- | --- |
| ASTM D 482-95 | Ash Content | wt % | 0.005 |
| ASTM D 93 | Flash Point by PMCC | ° F. | 190 |
| ASTM D 1298 | API Gravity @60° F. | °API | 33.9 |
| ASTM D 4052 | API Gravity @60° F. | °API | 33.9 |

-continued

| Test | Common Name | Test Units | Results |
|---|---|---|---|
| ASTM D 4077 | Water Content | vol % | 0.08 |
| ASTM D 445 | Kinematic Viscosity @100° C. | cSt | 2.904 |
| ASTM D 445 | Kinematic Viscosity @100° F. | cSt | 11.62 |
| ASTM D 445 | Kinematic Viscosity @40° F. | | 10.71 |
| ASTM D 2887-97a-Ext'd | Distillation, 99% Recovery | ° F. | 924 |
| ASTM D 1500-98 | Color | ASTM | L2.0 |
| ASTM D 2270-93 | Viscosity Index | | 124 |
| ASTM D 4530-93 | Carbon Residue (micro method) | | <0.1 |
| ASTM D 4294-98 | Total Sulfur | wt % | 0.244 |
| ASTM 6762 | Nitrogen | mg/Kg | 46.0 |
| AAS by Acid Digestion | Iron | ppm-wt | 0.4 |
| AAS by Acid Digestion | Nickel | ppm-wt | <0.1 |
| AAS by Acid Digestion | Copper | ppm-wt | 0.2 |

Example 11

This example illustrates the comparison of used oil before and after supercritical cleanup using the apparatus of this invention and $CO_2$ as the extracting fluid.

The following table lists the properties of the oil after treatment:

| Test | Value | Test | Value |
|---|---|---|---|
| Viscosity Index. D-2270 | 85 | Viscosity CST @40° F., D-445 | 31.38 |
| Appearance | Clear & Bright yellow liquid | Pour Point, ° F., D-97 | <-10 |
| Odor | Petroleum | Sulfur wt %, D-4294 | 0.2802 |
| Viscosity SUS @210° F., D | 43.0 | Ash wt %, D-482 | <0.001 |
| Viscosity SUS @100° F., D-445 | 154.1 | Color, D-1500 | 1.5 |
| Gravity API @ | 31.8 | Actual flash point, COC D-92 | 400° F. |
| Flash point, S.W. 101, ° F. | 230+ | Metals | 0.10 |

Example 12

This example illustrates the comparison of used oil before and after supercritical cleanup using the apparatus of this invention and $CO_2$ as the extracting fluid.

The following table lists the properties of the oil before and after treatment:

| Spec | Before | After | Diff | % Diff | +/- |
|---|---|---|---|---|---|
| Ash | 0.365 | 0.005 | 0.360 | 98.6 | Decrease |
| Water | 6.32 | 0.03 | 6.29 | 99.5 | Decrease |
| Viscosity | 24.47 | 2.904 | 21.566 | 88.1 | Decrease |
| Flash | 190 | 230 | 40 | 21 | Increase |
| API Gravity | 28.8 | 33.9 | 5.1 | 17.7 | Increase |
| Sulfur | 0.337 | 0.244 | 0.093 | 27.7 | Decrease |

Example 13

This example illustrates the comparison of used oil before and after supercritical cleanup using the apparatus of this invention and $CO_2$ as the extracting fluid.

The following table lists the properties of the oil before and after treatment:

| Spec | Before | After | Diff | % Diff | +/- |
|---|---|---|---|---|---|
| Ash | 0.4 | 0.02 | 0.38 | 95 | Decrease |
| Water | 6.4 | 0.4 | 6.0 | 93.75 | Decrease |
| Flash | 200+ | 200+ | — | — | — |
| Sulfur | 0.3 | 0.3 | — | — | — |

Example 14

This example illustrates the comparison of used oil before and after supercritical cleanup using the apparatus of this invention and $CO_2$ as the extracting fluid.

The following table lists the properties of the oil before and after treatment:

| Parameter | Test Method | Detection Limit | Before | After |
|---|---|---|---|---|
| Gravity API@ 60° F. | D-287 | — | 28.2 | 29.7 |
| Flash Point, ° F. | S.W. 1010 | −10 | BFO | 380 |
| Viscosity CST @ 40° C. | D-445 | 1 | 24.37 | 35.63 |
| Pour Point, ° F. | D-97 | −10 | <−10 | <−10 |
| Sulfur, wt % | D-4294 | 0.0001 | 0.3116 | 0.3019 |
| Ash, wt % | D-482 | 0.001 | 0.315 | 0.004 |
| Total Halogen, PPM | D-808 | 1.0 | 617.2 | 10.6 |
| PCB's, PPM | S.W. 8082 | 0.05 | BDL | BDL |
| Water by distillation, Vol % | D-95 | 0.05 | 6.4 | <0.05 |
| Sediment by Extraction, wt % | D-473 | 0.01 | 0.05 | <0.01 |
| Heat of Combustion, BTU/lb | D-240 | 10 | 17,761 | 19,302 |
| Heat of Combustion, BTU/gal | D-240 | 60 | 131,040 | 141,078 |
| Carbon Residue Ramsbottom, wt % | D-524 | 0.01 | — | 0.06 |
| Heavy Metals PPM | | | | |
| Arsenic | EPA-6010 | 0.0012 | BDL | BDL |
| Cadmium | EPA-6010 | 0.0015 | 0.113 | 0.014 |
| Chromium | EPA-6010 | 0.0040 | 0.525 | 0.007 |
| Lead | EPA-6010 | 0.0140 | 9.693 | 0.338 |
| Nickel | EPA-6010 | 0.0055 | 4.021 | BDL |
| Sodium | EPA-6010 | 0.0010 | 66.277 | 1.823 |
| Vanadium | EPA-6010 | 0.0020 | 0.030 | 0.015 |
| Iron | EPA-6010 | 0.0015 | 31.981 | 0.351 |

BDL—beyond detection limit; BFO—Blows flame out @200° F.

| Recovery, D-86 | Distillation, ° F. |
|---|---|
| IBP | 542 |
| 5% Recovery | 602 |
| 10% Recovery | 670 |
| 20% Recovery | 690 |
| 30% Recovery | 700 |
| 40% Recovery | 708 |
| 50% Recovery | 714 |
| 60% Recovery | 718 |
| 70% Recovery | 728 |
| 80% Recovery | 740 |
| 90% Recovery | 756 |
| 95% Recovery | 788 |
| End Point | 796 |
| Recovery | 98.0% |
| Residue | 1.5% |
| Loss | 0.5% |

Example 15

This example illustrates the analytical data for the oil extracted from a drilling fluid under supercritical cleanup using the apparatus of this invention and $CO_2$ as the extracting fluid.

The following table lists the properties of the drilling fluid recovered oil:

| Parameter | Test Method | Results |
|---|---|---|
| Gravity API@60° F. | D-287 | 38.0 |
| Flash Point, PMCC ° F. | D-93 | 148 |
| Viscosity CST @100° F. | D-445 | 2.73 |
| Pour Point, ° F. | D-97 | −5 |
| Cloud Point, ° F. | D-2500 | 10 |
| Sulfur, wt % | D-4294 | 0.0615 |
| Ash, wt % | D-482 | <0.001 |
| Color | D-15 | 0.5 |
| PCB's, PPM | S.W. 8082 | BDL |
| Water by distillation, Vol % | D-95 | <0.05 |
| Sediment by Extraction, wt % | D-473 | <0.01 |
| Carbon Residue Ramsbottom, wt % | D-524 | 0.06 |
| Carbon Residue Ramsbottom, wt% on 10% residue | D-524 | 0.20 |
| Cetane Index | D-976 | 54.0 |
| Bacteria Count, Counts/mL | — | 0 |
| Heavy Metals PPM | Method | Before |
| Arsenic | EPA-6010 | BDL |
| Cadmium | EPA-6010 | BDL |
| Chromium | EPA-6010 | 0.006 |
| Lead | EPA-6010 | 0.254 |
| Nickel | EPA-6010 | BDL |
| Sodium | EPA-6010 | 0.572 |
| Vanadium | EPA-6010 | BDL |
| Iron | EPA-6010 | 0.039 |

BDL—beyond detection limit; BFO—Blows flame out @200° F.; same detection limits as in Example 14

| Recovery, D-86 | Distillation, ° F. |
|---|---|
| IBP | 354 |
| 5% Recovery | 396 |
| 10% Recovery | 408 |
| 20% Recovery | 438 |
| 30% Recovery | 460 |
| 40% Recovery | 482 |
| 50% Recovery | 528 |
| 60% Recovery | 554 |
| 70% Recovery | 578 |
| 80% Recovery | 600 |
| 90% Recovery | 636 |
| 95% Recovery | 674 |

-continued

| | |
|---|---|
| End Point | 698 |
| Accelerated Stability, F 21-61 | Value |
| Initial Color | 0.5 |
| Final Color | 1.0 |
| Pad Rating (Blotter) | 1 |

All references cited herein are incorporated by reference. While this invention has been described fully and completely, it should be understood that, within the scope of the appended claims, the invention may be practiced otherwise than as specifically described. Although the invention has been disclosed with reference to its preferred embodiments, from reading this description those of skill in the art may appreciate changes and modification that may be made which do not depart from the scope and spirit of the invention as described above and claimed hereafter.

We claim:

1. A process for cleaning a material comprising the step of:
    charging a quantity of a material-to-be-treated selected from the group consisting of drilling fluids, reactor sludges, oil-contaminated soils, oil contaminated water, used oil, hydrocarbon fuels, tar sands, tanker bottoms, refinery bottoms, oil pit residues, refinery waste streams, refinery residue streams, paint wastes, and polymer wastes, where the material-to-be-treated comprises water and water soluble aqueous components, a non-aqueous fluid, and solid materials into an interior of an inner tube of a tubular extraction vessel comprising: an upper portion including an outer tube, an middle tube, and the inner tube; a semi-permeable membrane; and a lower portion,
    pressurizing an extraction fluid consisting of $CO_2$ to a desired high pressure to produce a pressurized extraction fluid and heat;
    charging a quantity of the pressurized extraction fluid to a plurality of interior sites of the tubular reactor until the fluid is at or above its critical point,
    contacting the material-to-be-treated with the pressurized extracting fluid under conditions of temperature and pressure sufficient to maintain the fluid at, near or above its critical point to produce a treated material comprising the extraction fluid, the non-aqueous fluid and the solid materials;
    concurrently, removing water and water soluble components via the semi-permeable membrane into the lower portion of the tubular extraction vessel to produce an aqueous product,
    forwarding the treated material into a first separation vessel comprising an interior, a treated material inlet, a fluid outlet and a solids outlet having a venturi valve,
    removing the solids materials from the first separation vessel through the venturi valve to a solids storage container to produce a solids product,
    removing a fluid comprising the non-aqueous fluid and the extraction fluid from the first separation vessel and forwarding the fluid to a second separation vessel having a fluid level sensor,
    separating the fluid in the second separation vessel into a used extraction fluid and a non-aqueous fluid product,
    transferring the non-aqueous fluid product to a fluid storage container; and
    transferring thermal energy from the pressurizing step to the concurrent removing step and the separating step to warm the aqueous product and to warm the non-aqueous fluid product to improve the overall power requirements of the process.

2. The process of claim 1, wherein the extracting fluid is selected from the group consisting of Xe, $NH_3$, lower aromatics, nitrous oxide, CO, $CO_2$, lower alcohols, lower alkanes, lower alkenes and mixtures or combinations thereof.

3. The process of claim 1, wherein the extracting fluid comprises a major portion of $CO_2$, and a minor portion of a secondary fluid selected from the groups consisting of Xe, $NH_3$, lower aromatics, nitrous oxide, CO, lower alcohols, lower alkanes, lower alkenes and mixtures or combinations thereof.

4. The process of claim 1, wherein the extracting fluid is $CO_2$.

5. The process of claim 1, wherein the material-to-be-treated is a drilling fluid and the non-aqueous fluid product comprises a hydrocarbon product substantially free of contaminants, and the solids product is substantially free of hydrocarbons and other contaminants.

6. The process of claim 1, wherein the material-to-be-treated is a used oil and the non-aqueous fluid product comprises a cleaned oil substantially free of water and water soluble contaminants and substantially free of solids.

7. The process of claim 6, wherein the cleaned oil has a lower sulfur content than the used oil prior to cleaning.

8. The process of claim 1, wherein the material-to-be-treated is a hydrocarbon fuel and the non-aqueous fluid product comprises a cleaned fuel having a lower sulfur content than the hydrocarbon fuel prior to cleaning.

9. The process of claim 1, wherein the material is a hydrocarbon contaminated soil and the non-aqueous fluid product comprises a hydrocarbon product substantially free of solids, water and water soluble contaminants, the solids product comprises a cleaned soil substantially free of hydrocarbon and other contaminants, and the aqueous product is substantially free of hydrocarbon.

* * * * *